United States Patent
Shajenko, Jr. et al.

(10) Patent No.: US 8,959,287 B1
(45) Date of Patent: Feb. 17, 2015

(54) MANAGING CACHES FOR REPORTING STORAGE SYSTEM INFORMATION

(75) Inventors: Peter Shajenko, Jr., Merrimack, NH (US); Deene A. Dafoe, Northborough, MA (US); Kevin S. Labonte, Upton, MA (US)

(73) Assignee: EMC Corporation, Hopkinton, MA (US)

( * ) Notice: Subject to any disclaimer, the term of this patent is extended or adjusted under 35 U.S.C. 154(b) by 381 days.

(21) Appl. No.: 13/249,323

(22) Filed: Sep. 30, 2011

(51) Int. Cl.
*G06F 12/08* (2006.01)

(52) U.S. Cl.
USPC .......................................................... 711/119

(58) Field of Classification Search
CPC .............................. G06F 9/45558; G06F 9/455
USPC ........................................................ 711/119
See application file for complete search history.

(56) References Cited

U.S. PATENT DOCUMENTS

| | | | | |
|---|---|---|---|---|
| 7,689,660 | B2 * | 3/2010 | Kilian et al. .................. | 709/213 |
| 2008/0040484 | A1 * | 2/2008 | Yardley ........................ | 709/227 |
| 2010/0070575 | A1 * | 3/2010 | Bergquist et al. ............. | 709/203 |
| 2011/0119391 | A1 * | 5/2011 | Maes ............................ | 709/230 |

OTHER PUBLICATIONS

Schulz, George, Why VASA is important to have in your VMware CASA , Sep. 20, 2011, The Virtualization Pract, p. 1-4.*
Schulz, George, Why VASA is Important to Have in Your VMware Casa, Sep. 20, 2011, The Virtualization Practice, p. 1-4.*

* cited by examiner

*Primary Examiner* — April Y Blair
*Assistant Examiner* — Kenneth Tsang
(74) *Attorney, Agent, or Firm* — Deepika Bhayana; Jason A. Reyes; Krishnendu Gupta

(57) ABSTRACT

A method is used in managing caches for reporting storage system information. A cache is created. The cache includes information associated with a set of storage objects of a data storage system. The information of the cache is made available to a virtual system. The virtual system uses the information for reporting storage system information. The virtual system is notified for retrieving updated storage system information from the cache.

16 Claims, 16 Drawing Sheets

MANAGING CACHES FOR REPORTING STORAGE SYSTEM INFORMATION

BACKGROUND

1. Technical Field

This application relates to managing caches for reporting storage system information.

2. Description of Related Art

Computer systems may include different resources used by one or more host processors. Resources and processors in a computer system may be interconnected by one or more communication connections. These resources may include, for example, data storage systems, such as the Symmetrix™ or CLARiiON™ (also referred to herein as Clariion) family of data storage systems manufactured by EMC Corporation. These data storage systems may be coupled to one or more host processors and provide storage services to each host processor. An example data storage system may include one or more data storage devices, such as those of the Symmetrix™ family, that are connected together and may be used to provide common data storage for one or more host processors in a computer system.

In a common implementation, a Storage Area Network (SAN) is used to connect computing devices with a large number of storage devices. Management and modeling programs may be used to manage these complex computing environments.

Storage Management Initiative Specification (SMI-S), and Common Information Model (CIM) technologies, are widely used for managing storage devices and storage environments. CIM is described further below. The SMI-S is a standard management interface that allows different classes of hardware and software products to interoperate for monitoring and controlling resources. For example, the SMI-S permits storage management systems to identify, classify, monitor, and control physical and logical resources in a SAN. The SMI-S is based on CIM, and Web-Based Enterprise Management (WBEM) architecture. CIM is a model for describing management information, and WBEM is an architecture for using Internet technologies to manage systems and networks. The SMI-S uses CIM to define objects that represent storage entities such as Logical Unit Numbers (LUNs), disks, storage subsystems, switches, and hosts. (In many, but not all cases, the term "volume" or "logical volume" is interchangeable with the term "LUN".) CIM also defines the associations that may or may not exist between these objects, such as a disk being associated to a storage subsystem because it physically resides in the storage subsystem.

The CIM objects mentioned above may be managed by a CIM object manager (CIMOM). A storage management software application can use a CIM client to connect to a CIMOM, to retrieve information about the storage entities that the CIMOM manages, and also to perform active configuration of the storage entities. Storage management software that uses a CIM client may be called a CIM client application. For example, SMI-S describes how a current storage LUN is mapped. A CIM server is a CIMOM and a set of CIM providers. The SMI-S describes several methods for assigning a LUN from a disk storage system to a host, or for adding a LUN to a disk storage system.

Virtual processing such as VMware is another known area that offers advantages in data processing, including in the area of apparent configuration to a user. It would be advancement in both the virtual processing and data storage arts to exploit better the respective individual capabilities for reaping more and better benefits for users in the respective fields.

SUMMARY OF THE INVENTION

A method is used in managing caches for reporting storage system information. A cache is created. The cache includes information associated with a set of storage objects of a data storage system. The information of the cache is made available to a virtual system. The virtual system uses the information for reporting storage system information. The virtual system is notified for retrieving updated storage system information from the cache.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
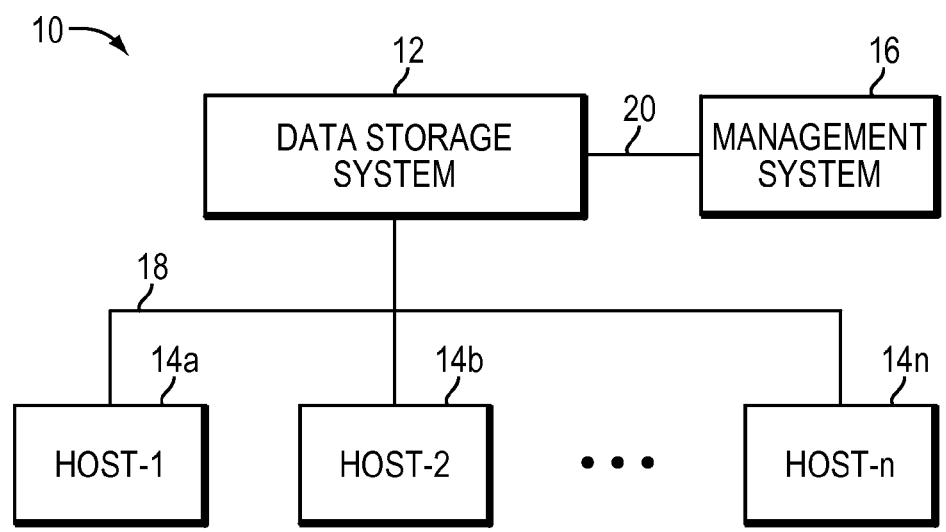
FIG. 1 is an example of an embodiment of a computer system that may utilize the techniques described herein.

Described below is a technique for use in managing caches for reporting storage system information, which technique may be used to provide, among other things, creating a cache that includes information associated with a set of storage objects of a data storage system, making the information of the cache available to a virtual system, and notifying the virtual system regarding a change in the information such that the virtual system retrieves updated storage system information from the cache.

Generally, a virtual system (e.g., a virtual data center manager client or simply referred to as "virtual client") creates a session with a data storage system for reporting storage provisioned for the virtual system by the data storage system. A session is associated with a session view. A session view is represented by a usage context that includes storage system information associated with storage objects provisioned for use by a virtual system. Typically, a virtual system may send one or more queries to a data storage system for gathering storage system information associated with a usage context. Further, a virtual system may send one or more queries for gathering updated storage system information associated with changes to configuration of storage objects and health status of a data storage system.

Conventionally, a virtual system sends a query to a data storage system for retrieving storage system information regarding storage provisioned for the virtual system. In such a conventional system, a data storage system gathers a large amount of information associated with each storage object provisioned for the virtual system. In such a conventional case, the large amount of information is gathered regardless of a change in the information since the information has last been retrieved by the virtual system. Hence, in such a conventional system, a large number of virtual systems may consume a large amount of memory of a data storage system by creating a large number of sessions, which as a result, processes a large amount of data, thereby increasing a response time for a query, and an amount of overhead involved in processing the query by a storage processor of the data storage system. Further, in such a conventional system, a query initiated by a virtual system takes longer to complete because the query attempts to retrieve information regarding every storage object provisioned by the virtual system even when the virtual system needs to report information associated with a subset of the storage objects provisioned for use by the virtual system.

By contrast, in at least some implementations in accordance with the current technique as described herein, creating a cache for storing and managing storage system information regarding a set of storage objects associated with a usage context of a virtual client enables the virtual client to report the storage system information to a user faster and efficiently. In at least one embodiment of the current technique, when a virtual client creates a first session with a data storage system, a cache is created using storage system information of storage objects provisioned for use by the virtual client such that the storage system information is retrieved from the data storage system by performing one or more queries. However, in such a case, the data storage system may take a long time to initialize the cache with the storage system information, thereby causing a delay in responding to a first query issued by the virtual client. But, in such a case, once the data storage initializes the cache with the storage system information associated with storage objects, subsequent queries issued by the virtual client for retrieving storage system information are processed faster and efficiently. Thus, in at least one embodiment of the current technique, sessions created by a virtual client for querying storage system information from a data storage system retrieves the storage system information from the cache created by the data storage system. Further, in at least one embodiment of the current technique, a registration mechanism is used for notifying a virtual client regarding a change in storage system information associated with storage objects provisioned for the virtual client. Further, in at least one embodiment of the current technique, a notification regarding a change in storage system information is processed by the cache such that a virtual client is notified regarding the change, and a session view of the virtual client is updated in order to maintain consistent storage system information across each session view created by the virtual client. Additionally, in at least one embodiment of the current technique, the cache may be rebuild completely when the cache is unable to process notifications regarding changes to storage system information and becomes out of sync with up-to-date storage system information.

By contrast, in at least some implementations in accordance with the current technique as described herein, the use of the managing caches for reporting storage system information can provide one or more of the following advantages: reducing an amount of time for reporting storage system information for a virtual system by retrieving the storage system information from a cache that is managed by a data storage system, increasing performance of a data storage system by managing a cache of storage system information and providing storage system information stored in the cache to virtual clients, improving scalability of a data storage system by efficiently managing a large amount of queries from virtual clients and decreasing an amount of overhead involved in processing storage system information by using a cache.

Referring now to FIG. 1, shown is an example of an embodiment of a computer system that may be used in connection with performing the storage mapping technique described herein. The computer system 10 includes one or more data storage systems 12 connected to servers (also referred to as hosts or host systems) 14a-14n through communication medium 18. At least one of the host systems 14a-14n includes or provides one or more virtual machines as described below. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or Fibre Channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of a variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 and in at least one of the host computers 14a-14n are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes.

Figure 2:
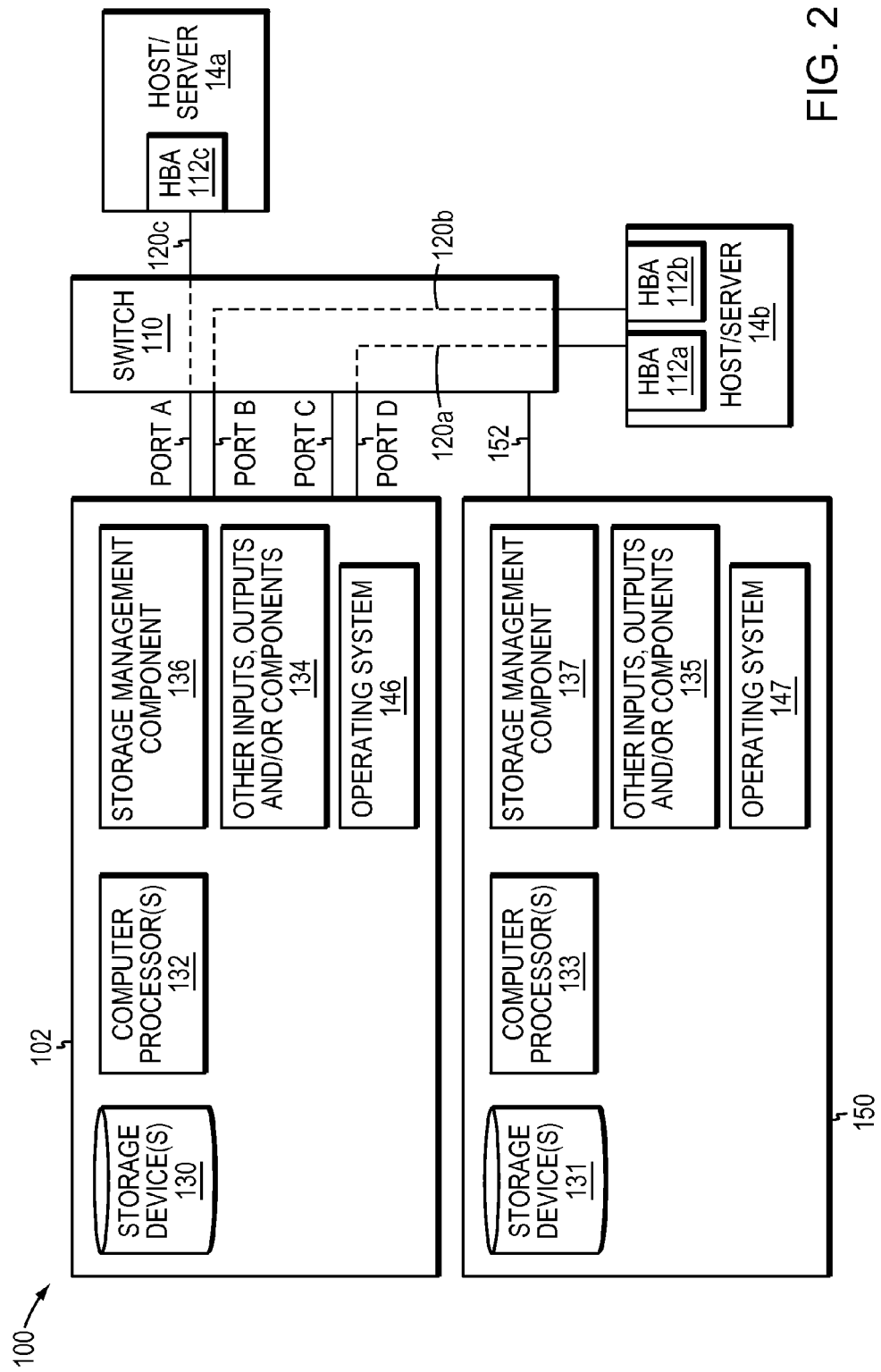
FIGS. 2-10 are block diagrams illustrating in more detail components that may be used in connection with techniques herein.

Referring now to FIG. 2, shown is an example 100 of components that may be used in connection with the current technique described herein. The example 100 may represent components illustrated in connection of FIG. 1 configured in a storage area network (SAN). Included in the example 100 are data storage systems 102 and 150, a switch 110, and hosts or servers 14a and 14b. The switch 110 may be used in connection with facilitating communications between each of the hosts 14a and 14b and the data storage systems 102 and 150. Communications between a host and the data storage system 102 may be defined in terms of a path. Host 14a communicates with the data storage system 102 over a path designated as 120c. Path 120c is formed by the starting point, the HBA or host bus adapter 112c and the ending point, port A of the receiving data storage system 102. Host 14b communicates with the data storage system 102 over two paths designated as 120a and 120b. Path 120a is formed by the starting point, the HBA 112a, and the ending point, port d of the receiving data storage system 102. Path 120b is formed by the starting point, the HBA 112b, and the ending point, port b of the receiving data storage system 102. It should be noted that different HBAs from the same or different hosts may also communicate with the data storage system through a same port of the data storage system although each path 112a, 112b, and 112c use a different port. An embodiment may represent a path using the WWN (world wide name) of a host's HBA and the WWN of a data storage system port receiving the request. As known to those skilled in the art, a WWN is a unique number assigned by a recognized naming authority that identifies a connection or a set of connections to the network. As also known to those skilled in the art, various networking technologies that may be used in an embodiment make use of WWNs.

Each HBA may include one or more ports although in the example illustrated, each HBA has only a single port. As represented with element 152, connections between the hosts using switch 110 may be made with respect to data storage system 150. Although only two data storage system are illustrated for purposes of simplicity in illustration, each of the hosts may have connections to other data storage systems in the SAN. Additionally, each host may be connected to the data storage systems 102, 150 using other connections, including direct cabling, than as illustrated in FIG. 2.

The data storage systems 102, 150 are illustrated as each including one or more storage devices 130, 131, one or more computer processors 132, 133, an operating system 146, 147, a storage management component 136, 137, and other inputs, outputs and/or components 134, 135, which may include all or some of other logic described below.

An example of an embodiment of the data storage system 102 is the CLARiiON™ data storage system by EMC Corporation which includes two computer processors as represented by the element 132 although an embodiment may include a different number of processors for use in connection with the storage mapping technique described herein.

The one or more storage devices 130 may represent one or more physical devices, such as disk drives, that may be accessed in logical units (e.g., as LUNs) as described elsewhere herein. The operating system 146 may be any one of a variety of commercially available, proprietary, or other operating system capable of execution by the one or more computer processors 132 in accordance with the particulars of the data storage system 102.

As used herein, the term network storage refers generally to storage systems and storage array technology, including storage area network (SAN) implementations, network attached storage (NAS) implementations, and other storage architectures that provide a level of virtualization for underlying physical units of storage. In general, such storage architectures provide a useful mechanism for sharing storage resources amongst computational systems. In some cases, computational systems that share storage resources may be organized as a coordinated system (e.g., as a cluster or cooperatively managed pool of computational resources or virtualization systems). For example, in a failover cluster it may be desirable to share (or at least failover) virtual machine access to some storage units. Similarly, in a managed collection of virtualization systems, it may be desirable to migrate or otherwise transition virtual machine computations from one virtualization system to another. In some cases, at least some computational systems may operate independently of each other, e.g., employing independent and exclusive units of storage allocated from a storage pool (or pools) provided and/or managed using shared network storage.

Generally, either or both of the underlying computer systems and storage systems may be organizationally and/or geographically distributed. For example, some shared storage (particularly storage for data replication, fault tolerance, backup and disaster recovery) may reside remotely from a computational system that uses it. Of course, as will be appreciated by persons of ordinary skill in the art, remoteness of shared storage is a matter of degree. For example, depending on the configuration, network storage may reside across the globe, across the building, across the data center or across the rack or enclosure.

While embodiments of the current technique, particularly cluster-organized and/or enterprise scale systems, may build upon or exploit data distribution, replication and management features of modern network storage technology, further embodiments may be used in more modest computational systems that employ network storage technology. For example, even a single computer system may employ SAN-type storage facilities in its storage architecture. Thus, while some embodiments utilize network storage that can be shared and while at least some underlying elements thereof may be remote, persons of ordinary skill in the art will understand that for at least some embodiments, network storage need not be shared or remote.

In some embodiments of the current technique, particularly those that use SAN-type storage arrays, block-level I/O access to virtual machine state data can afford performance advantages. Similarly, encapsulation and/or isolation techniques may be employed in some encodings of virtual machine state data to limit access (e.g., by a guest application or operating system) to underlying data. Accordingly, certain embodiments can be provided in which non-commingled, encapsulated representations of virtual machine state are maintained in distinct storage volumes (or LUNs) of a SAN. Nonetheless, other embodiments, including those that use NAS-type or file-system-mediated access mechanisms may still allow a virtualization system to leverage storage system functionality in support of operations such as virtual machine migration, movement, cloning, check pointing, rollback and/or failover using suitable codings of virtual machine state data.

For concreteness, embodiments are described which are based on facilities, terminology and operations typical of certain processor architectures and systems, and based on terminology typical of certain operating systems, virtualization systems, storage systems and network protocols and/or services. That said, the embodiments are general to a wide variety of processor and system architectures (including both single and multi-processor architectures based on any of a variety of instruction set architectures), to numerous operating system implementations and to systems in which both conventional and virtualized hardware may be provided. As described herein, the embodiments are also general to a variety of storage architectures, including storage virtualization systems such as those based on storage area network (SAN) or network attached storage (NAS) technologies.

Accordingly, in view of the foregoing and without limitation on the range of underlying processor, hardware or system architectures, operating systems, storage architectures or virtualization techniques that may be used in embodiments of the current technique are described. Based on these descriptions, and on the claims that follow, persons of ordinary skill in the art will appreciate a broad range of suitable embodiments.

Figure 3:
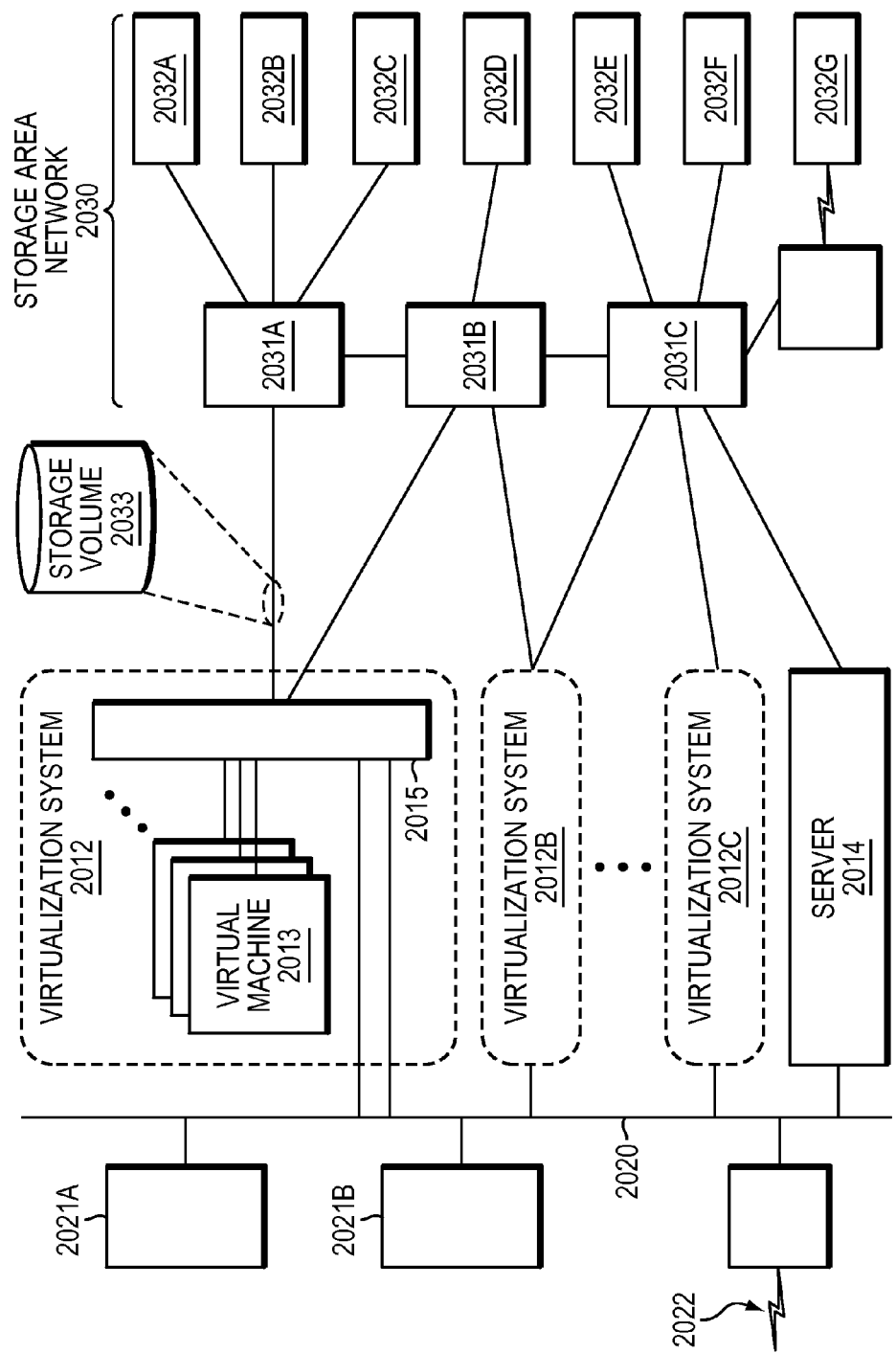

With respect to computational systems, generally, FIG. 3 depicts a collection or cluster of computational systems in which an embodiment of the current technique may be provided. In particular, FIG. 3 illustrates a collection or cluster in which at least a collection of virtualization systems 2012, 2012B, 2012C (but more generally, a mix of virtualization systems and conventional hardware systems such as server 2014) are configured to share storage resources. In the illustrated collection or cluster, constituent computational systems (e.g., virtualization systems 2012, 2012B, 2012C and server 2014) are coupled to network 2020 which is illustrated (for simplicity) as a local area network with client systems 2021A, 2021B and communications interface 2022, but will be more generally understood to represent any of a variety of networked information systems including configurations coupled to wide area networks and/or the Internet using any of a variety of communications media and protocols. One or more of systems 2012, 2012B, 2012C, 2014 may be, include, or be included in hosts 14a, 14b.

In the illustrated collection, storage area network (SAN) technology is used for at least some storage needs of computational systems participating in the collection. (The current technique can also be used for NAS storage allocated to a virtual machine environment.) In general, network storage systems (including SAN-based system 2030) provide a level of virtualization for underlying physical storage elements (e.g., individual disks, tapes and/or other media), where the characteristics and/or configuration of particular storage elements may be hidden from the systems that employ the storage. SAN-based systems typically provide an abstraction of storage pools from which individual storage units or volumes may be allocated or provisioned for block level I/O access. In the illustrated collection, a switched fabric topology consistent with Fibre Channel SAN technology is shown in which switches 2031A, 2031B, 2031C and/or directors are used to mediate high bandwidth access (typically using a SCSI, Small Computer System Interface, command set) to an extensible and potentially heterogeneous set of storage resources 2032A, 2032B, 2032C, 2032D, 2032E, 2032F, 2032G, e.g., SATA (Serial ATA) and/or SCSI disks, tape drives, as well as arrays thereof (e.g., RAID, i.e., Redundant Array of Inexpensive Disks). Such resources may be distributed and (if desirable) may provide data replication and/or off-site storage elements. Fibre Channel is a gigabit-speed network technology standardized in the T11 Technical Committee of the Inter National Committee for Information Technology Standards (INCITS). One or more of switches 2031A, 2031B, 2031C may be, include, or be included in switch 110. One or more of storage resources 2032A, 2032B, 2032C, 2032D, 2032E, 2032F, 2032G, may be, include, or be included in one or more of data storage systems 102, 150.

In general, a variety of different types of interconnect entities, including, without limitation, directors, switches, hubs, routers, gateways, and bridges may be used in topologies (or sub-topologies) that include point-to-point, arbitrated loop, switched fabric portions. Fibre Channel and non-Fibre Channel technologies including those based on iSCSI protocols (i.e., SCSI command set over TCP/IP) or ATA-over-Ethernet (AoE) protocols may be used in embodiments of the storage mapping technique. Similarly, any of a variety of media including copper pair, optical fiber, etc. may be used in a network storage system such as SAN 2030.

Although not specifically illustrated in FIG. 3, persons of ordinary skill in the art will recognize that physical storage is typically organized into storage pools, possibly in the form of RAID groups/sets. Storage pools are then subdivided into storage units (e.g., storage volumes 2033 that are exposed to computer systems, e.g., as a SCSI LUN on a SAN communicating via Fibre Channel, iSCSI, etc.). In some environments, storage pools may be nested in a hierarchy, where pools are divided into sub-pools. In at least some cases, the term LUN may represent an address for an individual storage unit, and by extension, an identifier for a virtual disk of other storage device presented by a network storage system such as SAN 2030.

Embodiments of the current technique may be understood in the context of virtual machines 2013 (or virtual computers) that are presented or emulated within a virtualization system such as virtualization system 2012 executing on underlying hardware facilities 2015. However, in addition, migration from (or to) a computational system embodied as a conventional hardware-oriented system may be supported in some systems configured in accordance with the current technique. Nonetheless, for simplicity of description and ease of understanding, embodiments are described in which individual computational systems are embodied as virtualization systems that support one or more virtual machines.

Although certain virtualization strategies/designs are described herein, virtualization system 2012 is representative of a wide variety of designs and implementations in which underlying hardware resources are presented to software (typically to operating system software and/or applications) as virtualized instances of computational systems that may or may not precisely correspond to the underlying physical hardware.

With respect to virtualization systems, the term virtualization system as used herein refers to any one of an individual computer system with virtual machine management functionality, a virtual machine host, an aggregation of an individual computer system with virtual machine management functionality and one or more virtual machine hosts communicatively coupled with the individual computer system, etc. Examples of virtualization systems include commercial implementations, such as, for example and without limitation, VMware® ESX Server™ (VMware and ESX Server are trademarks of VMware, Inc.), VMware® Server, and VMware® Workstation, available from VMware, Inc., Palo Alto, Calif.; operating systems with virtualization support, such as Microsoft® Virtual Server 2005; and open-source implementations such as, for example and without limitation, available from XenSource, Inc.

As is well known in the field of computer science, a virtual machine is a software abstraction—a "virtualization"—of an actual physical computer system. Some interface is generally provided between the guest software within a VM and the various hardware components and devices in the underlying hardware platform. This interface-which can generally be termed "virtualization layer"—may include one or more software components and/or layers, possibly including one or more of the software components known in the field of virtual machine technology as "virtual machine monitors" (VMMs), "hypervisors," or virtualization "kernels."

Because virtualization terminology has evolved over time, these terms (when used in the art) do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself. However, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs is sometimes included in the host OS itself.

Embodiments are described and illustrated herein primarily as including one or more virtual machine monitors that appear as separate entities from other components of the virtualization software. This paradigm for illustrating virtual machine monitors is only for the sake of simplicity and clarity and by way of illustration. Differing functional boundaries may be appropriate for differing implementations. In general, functionality and software components/structures described herein can be implemented in any of a variety of appropriate places within the overall structure of the virtualization software (or overall software environment that includes the virtualization software).

With respect to the virtual machine monitor, in view of the above, and without limitation, an interface usually exists between a VM and an underlying platform which is responsible for executing VM-issued instructions and transferring data to and from memory and storage devices or underlying hardware. A VMM is usually a thin piece of software that runs directly on top of a host, or directly on the hardware, and virtualizes at least some of the resources of the physical host machine. The interface exported to the VM is then the same as the hardware interface of a physical machine. In some cases, the interface largely corresponds to the architecture, resources and device complements of the underlying physical hardware; however, in other cases it need not.

The VMM usually tracks and either forwards to some form of operating system, or itself schedules and handles, all requests by its VM for machine resources, as well as various faults and interrupts. An interrupt handling mechanism is therefore included in the VMM. As is well known, in the Intel IA-32 ("x86") architecture, such an interrupt/exception handling mechanism normally includes an interrupt descriptor table (IDT), or some similar table, which is typically a data structure that uses information in the interrupt signal to point to an entry address for a set of instructions that are to be executed whenever the interrupt/exception occurs. In the Intel IA-64 architecture, the interrupt table itself contains interrupt handling code and instead of looking up a target address from the interrupt table, it starts execution from an offset from the start of the interrupt when a fault or interrupt occurs. Analogous mechanisms are found in other architectures. Based on the description herein, interrupt handlers may be adapted to correspond to any appropriate interrupt/exception handling mechanism.

Although the VM (and thus applications executing in the VM and their users) cannot usually detect the presence of the VMM, the VMM and the VM may be viewed as together forming a single virtual computer. They are shown and described herein as separate components for the sake of clarity and to emphasize the virtual machine abstraction achieved. However, the boundary between VM and VMM is somewhat arbitrary. For example, while various virtualized hardware components such as virtual CPU(s), virtual memory, virtual disks, and virtual device(s) including virtual timers are presented as part of a VM for the sake of conceptual simplicity, in some virtualization system implementations, these "components" are at least partially implemented as constructs or emulations exposed to the VM by the VMM. One advantage of such an arrangement is that the VMM may be set up to expose "generic" devices, which facilitate VM migration and hardware platform-independence. In general, such functionality may be said to exist in the VM or the VMM.

Figure 4:
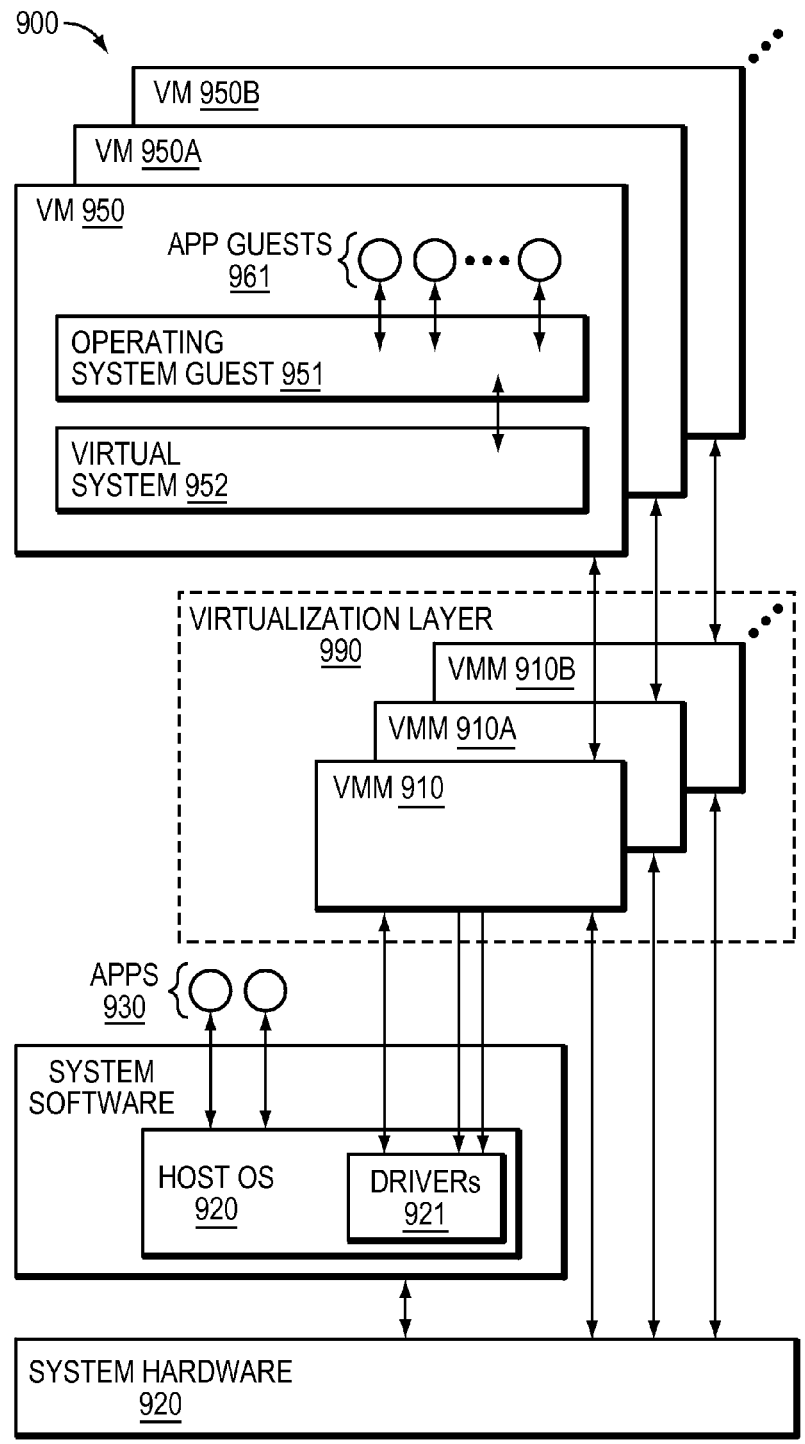
Figure 5:
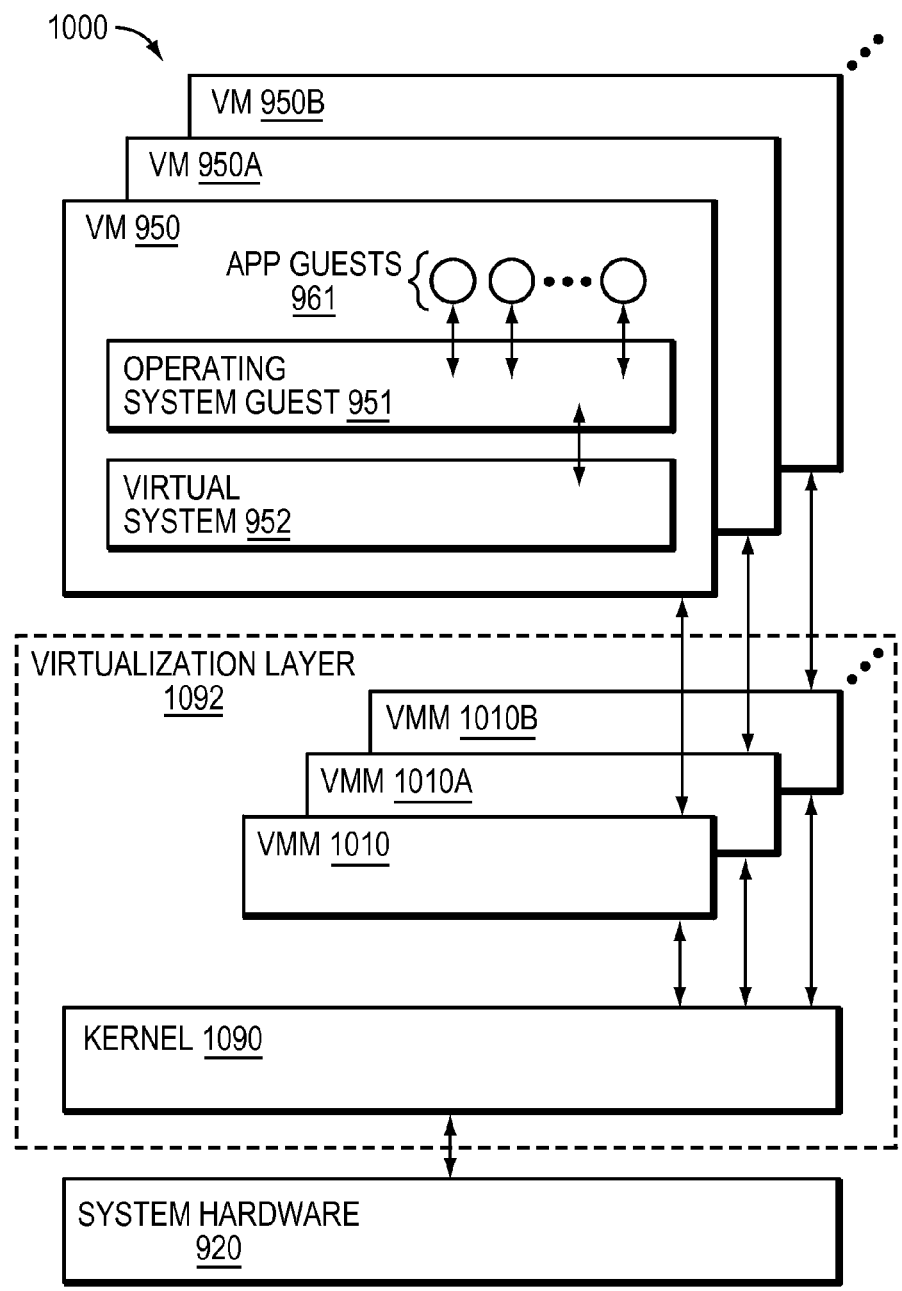

It is noted that while VMMs have been illustrated as executing on underlying system hardware, many implementations based on the basic abstraction may be implemented. In particular, some implementations of VMMs (and associated virtual machines) execute in coordination with a kernel that itself executes on underlying system hardware, while other implementations are hosted by an operating system executing on the underlying system hardware and VMMs (and associated virtual machines) executed in coordination with the host operating system. Such configurations, sometimes described as "hosted" and "non-hosted" configurations, are illustrated in FIGS. 4 and 5. However, the description herein refers to the physical system that hosts a virtual machine(s) and supporting components, whether in the "hosted" or "non-hosted" configuration, as a virtual machine host. To avoid confusion, the "hosted" configuration will be referred to herein as "OS hosted" and the "non-hosted" configuration will be referred to as "non-OS hosted." In the "OS hosted" configuration, an existing, general-purpose operating system (OS) acts as a "host" operating system that is used to perform certain I/O operations. In the "non-OS hosted" configuration, a kernel customized to support virtual machines takes the place of the conventional operating system.

With respect to OS hosted virtual computers, FIG. 4 depicts an embodiment of a virtualization system configuration referred to as an "OS hosted" configuration. Virtualization system 900 includes virtual machines 950, 950A, and 950B and respective virtual machine monitors VMM 910, VMM 910A, and VMM 910B. Virtualization system 900 also includes virtualization layer 990, which includes VMMs 910, 910A, and 910B. VMMs 910, 910A, and 910B are co-resident at system level with host operating system 920 such that VMMs 910, 910A, and 910B and host operating system 920 can independently modify the state of the host processor. VMMs call into the host operating system via driver 921 and a dedicated one of user-level applications 930 to have host OS 920 perform certain I/O operations on behalf of a corresponding VM. Virtual machines 950, 950A, and 950B in this configuration are thus hosted in that they run in coordination with host operating system 920. Virtual machine 950 is depicted as including application guests 961, operating system guest 951, and virtual system 952. Virtualization systems that include suitable facilities are available in the marketplace. For example, VMware® Server virtual infrastructure software available from VMware, Inc., Palo Alto, Calif. implements an OS hosted virtualization system configuration consistent with the illustration of FIG. 4; and VMware® Workstation desktop virtualization software, also available from VMware, Inc. also implements a hosted virtualization system configuration consistent with the illustration of FIG. 4.

With respect to non-OS hosted virtual computers, FIG. 5 depicts an embodiment of a virtualization system configuration referred to as a "non-OS hosted" virtual machine configuration. In FIG. 5, virtualization system 1000 includes virtual machines 950, 950A, and 950B as in FIG. 4. In contrast to FIG. 4, virtualization layer 1092 of FIG. 5 includes VMMs 1010, 1010A, and 1010B, and dedicated kernel 1090. Dedicated kernel 1090 takes the place, and performs the conventional functions, of a host operating system. Virtual computers (e.g., VM/VMM pairs) run on kernel 1090. Virtualization systems that include suitable kernels are available in the marketplace. For example, ESX Server™ virtual infrastructure software available from VMware, Inc., Palo Alto, Calif. implements a non-hosted virtualization system configuration consistent with the illustration of FIG. 5.

Different systems may implement virtualization to different degrees—"virtualization" generally relates to a spectrum of definitions rather than to a bright line, and often reflects a design choice in respect to a trade-off between speed and efficiency and isolation and universality. For example, "full virtualization" is sometimes used to denote a system in which no software components of any form are included in the guest other than those that would be found in a non-virtualized computer; thus, the OS guest could be an off-the-shelf, commercially available OS with no components included specifically to support use in a virtualized environment.

With respect to para-virtualization, as the term implies, a "para-virtualized" system is not "fully" virtualized, but rather a guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software. For some, the term para-virtualization implies that the OS guest (in particular, its kernel) is specifically designed to support such an interface. According to this definition, having, for example, an off-the-shelf version of Microsoft Windows XP as the OS guest would not be consistent with the notion of para-virtualization. Others define the term para-virtualization more broadly to include any OS guest with any code that is specifically intended to provide information directly to the other virtualization software. According to this definition, loading a module such as a driver designed to communicate with other virtualization components renders the system para-virtualized, even if the OS guest as such is an off-the-shelf, commercially available OS not specifically designed to support a virtualized computer system.

Unless otherwise indicated or apparent, virtualized systems herein are not restricted to use in systems with any particular "degree" of virtualization and are not to be limited to any particular notion of full or partial ("para-") virtualization.

In the preferred embodiment, the embodiment operates in cooperation and may be a part of computer software, operating the preferred EMC CLARiiON or Symmetrix storage systems available from EMC Corporation of Hopkinton, Mass., although one skilled in the art will recognize that the current technique may be used with other data storage systems. In the preferred embodiment, EMC CLARiiON storage system implements aspects of the current technique as part of software that operates with such a storage system.

In the preferred embodiment, VMware virtual processing includes the VMware ESX Server technology and provides a VMM and a VM that has at least one virtual processor and is operatively connected to the VMM for running a sequence of VM instructions, which are either directly executable or non-directly executable. VMware technology, including the ESX server, is described in U.S. Pat. No. 6,397,242 to Devine et. al, issued May 28, 2002, which is hereby incorporated in its entirety by this reference.

Figure 6:
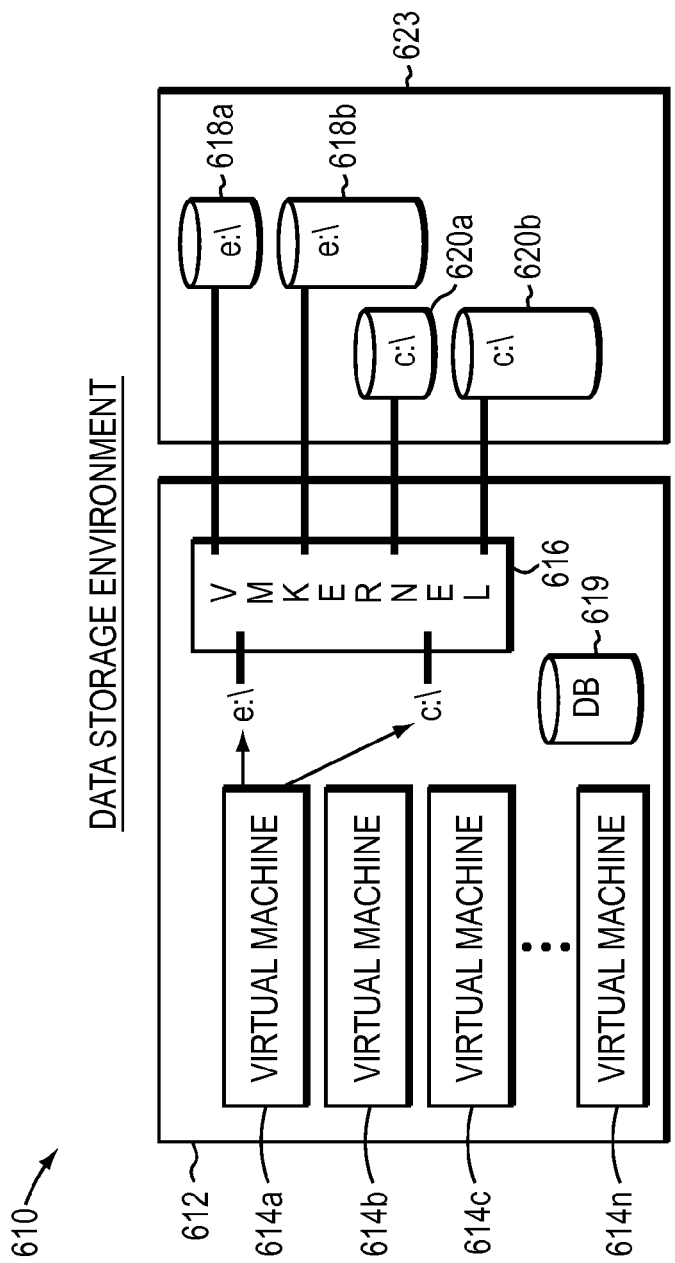

In a preferred embodiment, referring to FIG. 6, a Data Storage Environment 610 is shown including a VMware ESX Server 612 having a series of Virtual Machines 614a-n, a database 619 and VM Kernel 616. Server 612 engages on Data Storage System 623 logical units 618a-b and 620a-b, designated with virtual drive designations e: \ and c: \, respectively.

The VMware ESX Server is configured to boot Virtual Machines (VMs) from external storage. In the example case of a preferred embodiment shown in FIG. 6, a Data Storage System 623 (e.g., EMC CLARiiON) contains both the boot volume (c: \) and another volume (e: \) for a preferred Windows 2000 VM. Any VMware-supported Guest operating system would work in view of the teachings herein. Currently, such Guest operating systems include most of the popular x86 operating systems, including Windows and Linux. Similarly, additional drives could be added, up to half the supported number of Logical Unit Numbers (LUNs) on an ESX Server.

Figure 7:
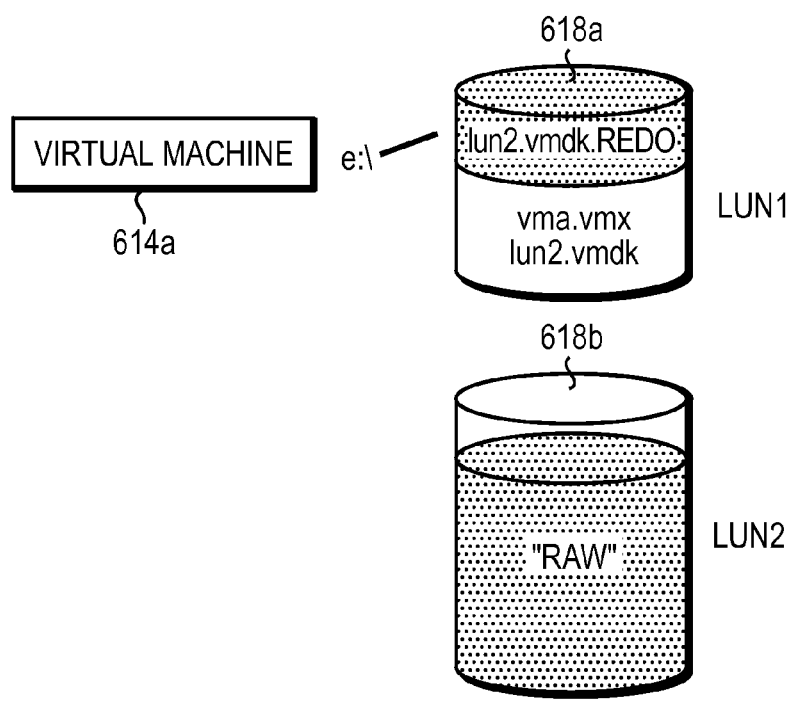

Regarding FIG. 7, taking a closer look at one of the volume pairs that has been discussed with reference to FIG. 6, it can be seen that logical volume 618a also known as LUN 1 has the VMware VM configuration (.vmx) file. It also has the other files that comprise the e: \ drive for Virtual Machine 614a. First, LUN 1 has a pointer—called lun2.vmdk—to the "raw disk" at logical volume 18a also known as LUN 2, where most of the data resides. Second, there is a standard VMware ESX Server ".REDO log" on LUN 1. This .REDO log contains tracks that have been changed since the last time a .REDO log had been written out, or flushed, to LUN 2. This uses the preferred VMware VMFS "raw disk mapping" (RDM) functionality. The VMkernel 616 of FIG. 6 presents one e:\ drive to the Virtual Machine 614a from a combination of data it finds on the two LUNs 618a and 618b.

Figure 8:
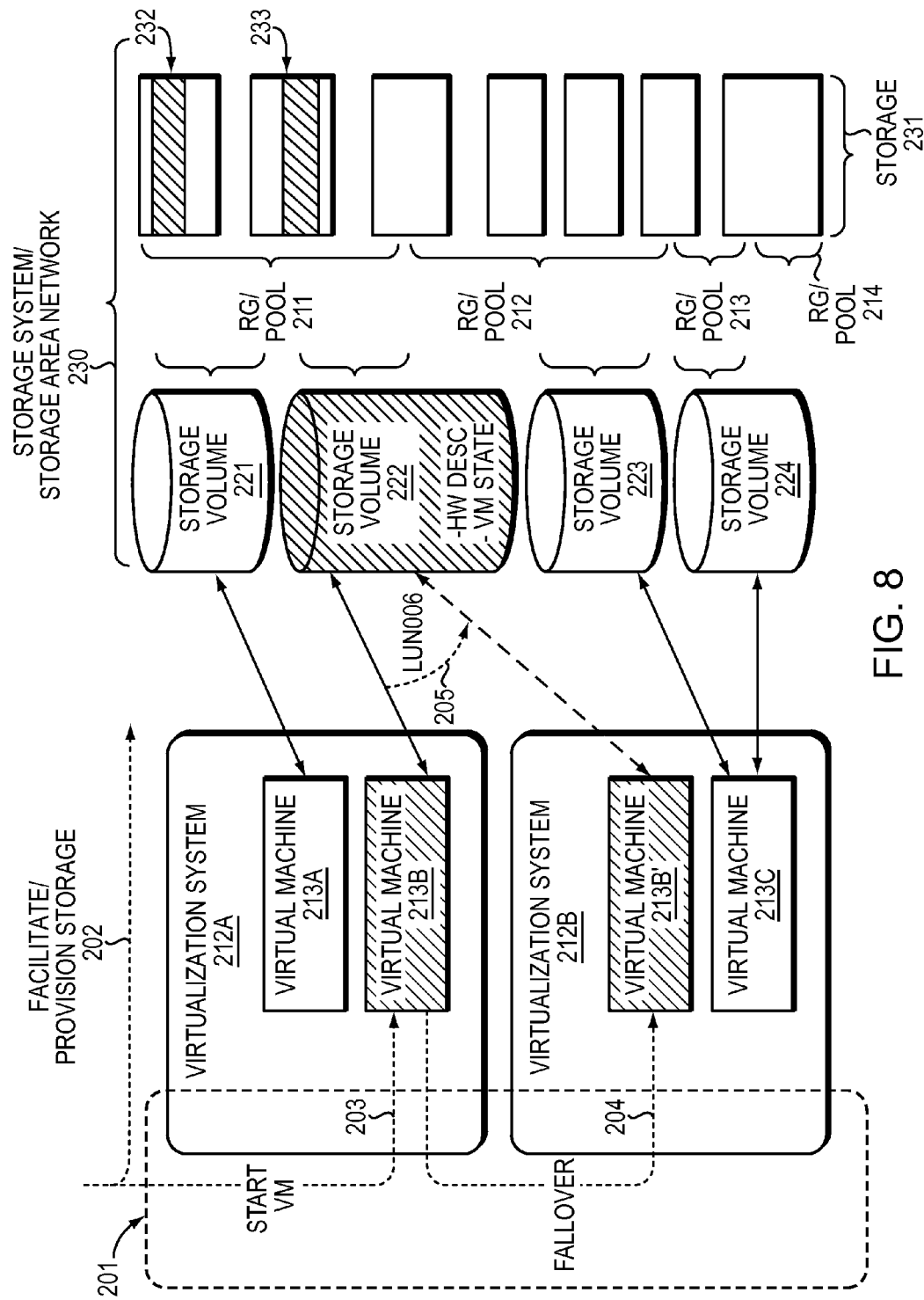

FIG. 8 illustrates an embodiment in which a coordination and provisioning system 201 (such as VMware® vCenter™ Server) is employed to facilitate provisioning of storage (202), e.g., LUNs, derived from underlying storage media 231 (and RAID groups (RGs) or pools 211, 212, 213 and 215) of storage system or storage area network (SAN) 230 and to provision, control and coordinate (see 203) execution of virtual machine instances (e.g., VMs 213A, 213B, 213C and 213D) on respective virtualization systems 212A and 212B.

Thus, for example, portions 232 and 233 of storage 231 may be provisioned from RAID group or pool 211 as storage volume 222 (LUN006) which may encode an encapsulation of an exposed virtual disk(s) and virtual machine state. System 201 may be used to handle a failover situation (204) for the virtual machine instances so that, for example, virtual machine instance 213B' can take over for a failed virtual machine instance 213B using LUN006. In general, a virtual server such as VMware® vCenter™ Server manages virtual machines. A virtual machine is associated with a unique identifier and information about its virtual devices, including virtual disks. Further, for example, vCenter™ Server as described above is part of a virtualized environment deployed using VMware® vSphere™.

Figure 9:
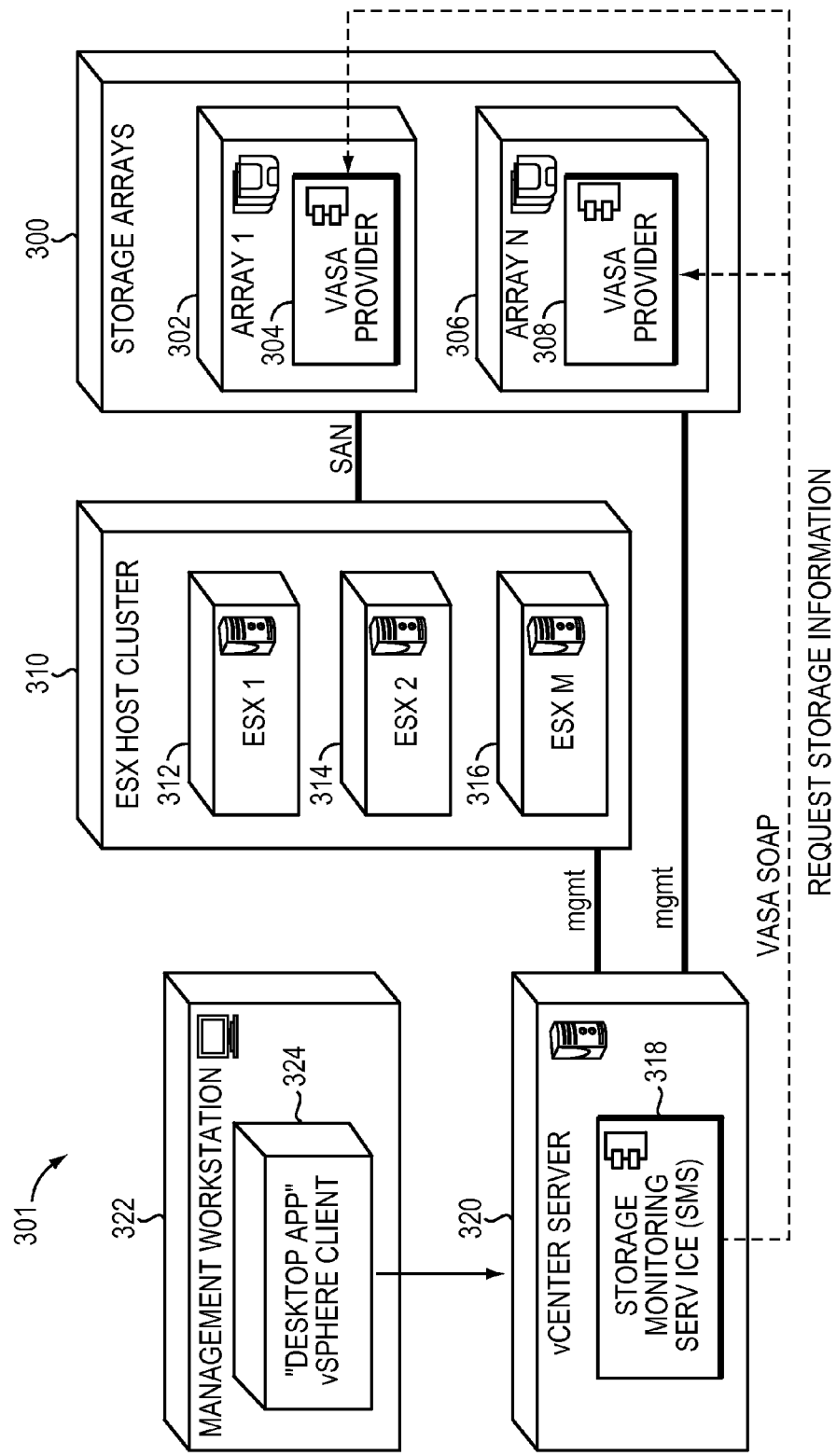

Referring to FIG. 9, shown is detailed representation of a collection of computational systems in which an embodiment of the current technique may be provided. A virtualization management system such as VMware® vSphere™ provides ability to perform cloud computing by utilizing virtualization system such as VMware® ESX server. VMware® vSphere™ is a virtualization platform that delivers infrastructure and application services, and consolidate a set of virtual machines on a single physical server without impacting or with minimal impact to performance or throughput of the physical server. A file system protocol such as VMware® vStorage Virtual Machine File System ("VMFS") allows virtual machines to access shared storage devices (e.g., Fibre Channel, iSCSI). A set of interfaces such as VMware® vStorage APIs for Storage Awareness ("VASA") enables integration of virtualized systems (e.g. VMs) with a data storage system that provides storage to virtual machines and supports data protection solutions. Further, VMware® vSphere™ provides management services such as VMware® vCenter™ Agent that allows vSphere™ hosts 310 to connect to vCenter™ Server 320 for centralized management of the hosts and virtual machines.

VMware® vCenter™ Server, formerly known as VMware® Virtual Center, is a centralized management tool for the VMware® vSphere™. VMware® vCenter™ Server 320 enables management of one or more ESX servers 312, 314, 316, and Virtual Machines (VMs) included in each ESX server using a single console application. VMware® vCenter™ Server 320 provides storage administrators insight into the status and configuration of clusters, hosts, VMs, storage, operating systems, and other critical components of a virtual infrastructure from a single place (e.g., console application). Further, VMware® vCenter™ Server 320 may be installed on a physical or virtual machine.

In a virtualized environment such as VMware® vSphere™ environment, a vCenter™ Server instance manages a set of ESX servers and storage resources associated with the set of ESX servers. Storage devices of a data storage system are used and managed by a vCenter™ Server instance.

Further, a user of a VMware® vSphere™ client 324 may access inventory and configuration information from one or more vCenter™ Servers. A user of vSphere™ client 324 may view storage information using an instance of a virtual server (e.g., vCenter™ Server instance) if the user possess valid permissions for accessing the virtual server. A single instance of vCenter™ Server provides capability to manage hundreds of hosts, and thousands of virtual machines. Further, one or more vCenter™ Servers may be linked together to provide capability to manage of thousands of hosts and tens of thousands of virtual machines using one or more vCenter™ Server instances via a single management console (e.g. VMware® vSphere™ client 322).

Further, vCenter™ Server 320 includes a status component 318 that displays the health of components of the vCenter™ Server 320 thereby enabling storage administrators to quickly identify and correct failures that may occur in the vCenter™ management infrastructure 301. Additionally, vCenter™ Server 320 provides alerts and/or alarms to storage administrators such that the storage administrators may attempt to resolve failures before the failures interrupt the availability of applications executing on storage resources of the vCenter™ Server 320.

In at least one embodiment of the current technique, a virtual system (e.g., VM, ESX Server) includes a storage tab that is displayed in a graphical user interface on a management console of the virtual system such that storage entities of a virtualized environment may be managed using storage information provided in the storage tab. Further, a user may set alerts and/or alarms in a virtual system. Further, a virtual server (e.g. vSphere™) in a virtualized environment provides a detailed view of every storage component included in a storage layout of the virtualized environment. A storage layout may provide information to storage administrators regarding available communication paths and a logical grouping of storage objects that may share storage resources. Further, a virtual server (e.g., vCenter™ Server 320) monitors storage resources by maintaining alarms for managed storage entities, such as data stores and clusters. An alarm may be set to trigger on an occurrence of a specific event such that the alarm may notify a storage administrator regarding the occurrence of the event. For example, an event may include a change in status (such as "Host Exited Maintenance Mode"), an access control operation (such as "Role Created"), and a license event (such as "License Expired"). In addition, an alarm is triggered only when the alarm satisfy a specific time condition in order to minimize the number of false alarms.

In at least one embodiment of the current technique, VASA interfaces are a vendor neutral set of interfaces defined by VMware® for reporting storage provisioned for a virtual machine in a virtualized environment. A VASA interface is a proprietary SOAP-based web interface that is used by a virtual machine deployed in a virtualized environment that is using one or more virtualized product or software from VMware®. A virtual machine uses a VASA interface for retrieving storage system information from data storage system 300. The storage system information includes information associated with storage devices of the data storage system 300 such that the information is used by a virtual machine for provisioning storage, monitoring storage and troubleshooting failures via a management system such as vCenter™ Server 320 of a virtualized environment (e.g. vSphere™). A data storage system 300 provides storage to a virtual machine such that users of the virtual machine may use the storage for operations such as storing and managing data. A server component 304, 308 (also referred to as "VASA server" or "VASA provider") resides on data storage system 300 such that the server component communicates with a virtual machine for providing storage information to the virtual machine. A client component (also referred to as "VASA client") resides on a virtual machine or virtual client (e.g., vCenter™ Server 320) managing one or more virtual machines. A VASA client connected to data storage system 300 creates a usage context such that the data storage system 300 provides storage information that is relevant to the usage context of the VASA client. Storage information reported by a data storage system may include information associated with a set of storage elements (also referred herein as "storage entities"). A storage entity is a storage object such as a LUN, file system, array, port. A storage monitoring service 318 executing on a virtual server 320 gathers storage information from data storage system 300 and provides the storage information to users of virtual machines (e.g., vSphere™ client 324).

A VASA interface provides information regarding a data storage system and storage devices of the data storage system in a vendor-neutral fashion which allows users of a virtual machine in a virtualized environment to explore the information associated with the storage devices that are consumed by the virtualized environment, and manage infrastructure of the virtualized environment in order to provide ability to monitor and troubleshoot the storage devices. For example, a user of a virtual machine may easily identify a problem affecting the virtual machine using a health status of a storage device.

In at least one embodiment of the current technique, VASA interfaces may include a set of connection interfaces (also referred to as "Application Programming Interface (API)") that help establish or remove a secure connection between vCenter™ Server 320 and VASA provider 304, 308. VASA provider 304, 308 uses a VASA interface to communicate with a virtual machine. Additionally, VASA interfaces may include a set of client context APIs that identifies a usage context of a virtual client which is required to retrieve storage information from data storage system 300. Further, VASA interfaces may include a set of storage discovery APIs that provide information regarding data storage system 300 and information associated with physical and logical storage devices of the data storage system 300 that are pertinent to a virtualized environment. Additionally, VASA interfaces may include a set of status APIs that provide information such as changes in storage configuration or system availability of data storage system 300. Further, A VASA interface may define a profile (such as a block, file and capability) to enable data storage system 300 to provide information associated with block storage devices, file systems stored on storage devices of the data storage system, storage capabilities of LUNs, and storage capabilities of file systems of the data storage system 300.

In at least one embodiment of the current technique, a VASA provider may be implemented as a modular generic framework that may execute a dynamically loadable library that is responsible for performing operations associated with a request issued by a VASA client. In at least one embodiment of the current technique, a VASA provider may reside on a control station of a file based data storage system. Alternatively, in at least one embodiment of the current technique, a VASA provider may reside on a storage processor of a block based data storage system. An instance of a VASA provider is created which executes on a data storage system and is configured by a user of a virtual machine included in vSphere™ system such that the vSphere™ may retrieve storage system information from the data storage system using the instance of the VASA provider.

Figure 10:
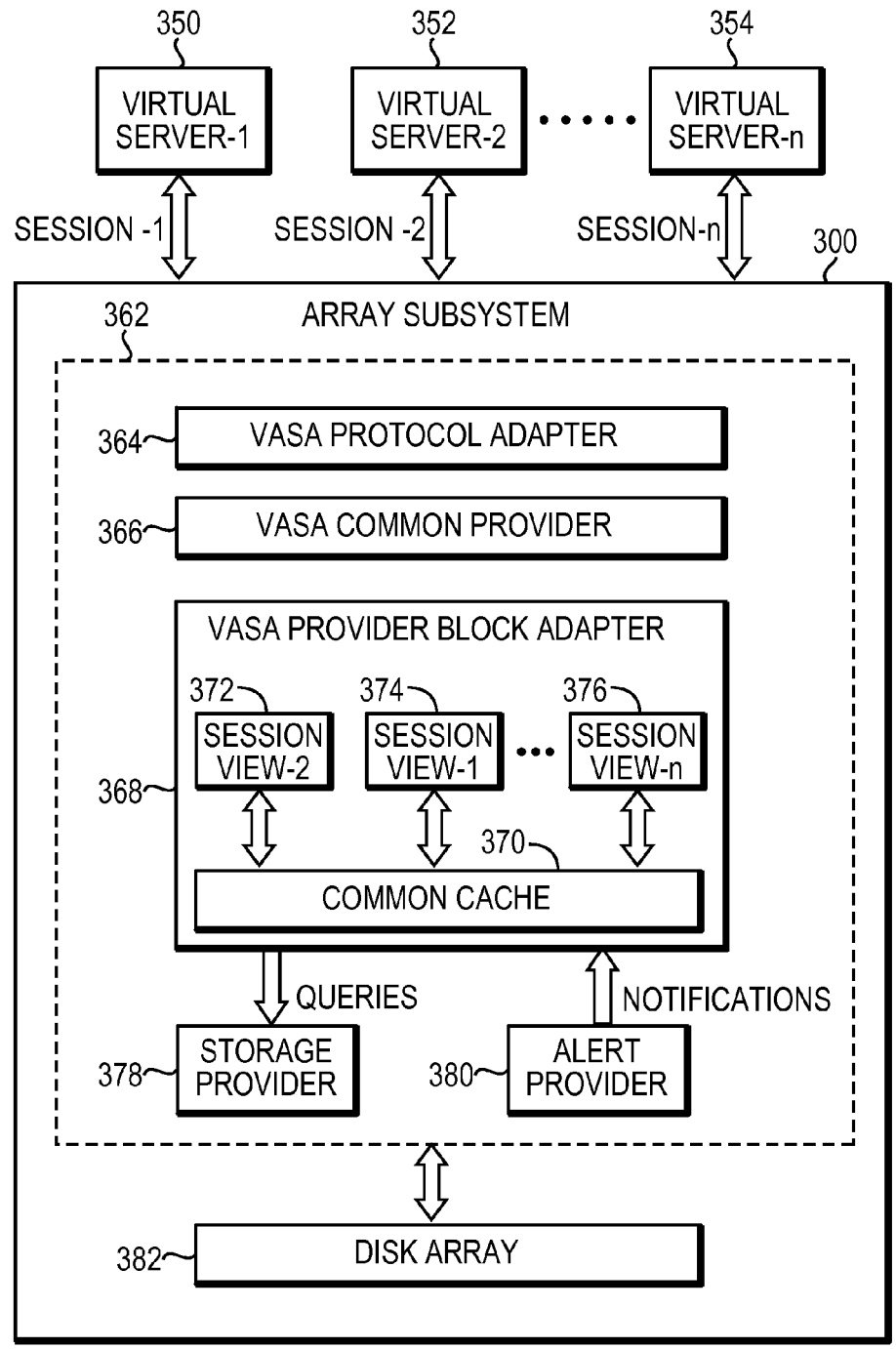

Referring to FIG. 10, shown is a more detailed representation of components that may be included in an embodiment using the techniques described herein. With reference also to FIG. 9, a virtual machine or virtual client such as vSphere™ client 322 connected to a virtual server such as vCenter™ Server 320 (illustrated in FIG. 10 as virtual server-1 350, virtual server-2 352, virtual server-n 354) initiates a connection between the virtual server and a VASA provider (e.g. VASA provider block adaptor 368) executing on a data storage system 300. A user (e.g. storage administrator) of the virtual client may need to provide credential information such as a Uniform Resource Locator (URL) address of the data storage system (e.g. "https://<IP address of storage processor or control station>/"), a user name for the user, and a password associated with the user name for establishing the connection. The credential information is used by the virtual server in order to establish a secure connection with the VASA provider. If the credential information is valid and accepted by the data storage system 300, a certificate for the virtual server is registered with the data storage system 300. The certificate is then used to authenticate subsequent requests from the virtual server. In at least one embodiment of the current technique, a session is started when a connection is established between a virtual server and data storage system 300, and the session ends when a user removes information regarding the VASA provider from configuration settings of the virtual server thereby resulting into termination of the secure connection.

In at least one embodiment of the current technique, a session is based on a secure HTTPS communication between a virtual server (e.g. vCenter™ Server) and a VASA Provider (e.g. VASA provider block adaptor 368). A secure HTTPS communication uses information such as a SSL certificate and a VASA session identifier to manage a secure connection. A virtual server provides credentials information such as a user name, password and certificate to a VASA interface (e.g., "RegisterVASACertificate" API) such that the VASA interface adds the certificate to a trust store of the virtual server.

In at least one embodiment of the current technique, a virtual server uses a VASA API (e.g., "SetContext" API) to initialize a session after a secure connection is established between the virtual server and data storage system 300. The "SetContext" API provides a storage object (e.g., "VasaVendorProviderInfo" object) as a return parameter, which includes a session identifier. A session identifier uniquely identifies a session created between a virtual server and an instance of a VASA provider 304, 308. A new session identifier is generated each time the "SetContext" API is invoked. A virtual server includes a session identifier associated with a session in an HTTP cookie that is sent with a request (e.g., VASA API) to the VASA provider 302, 308 of the data storage system 300 once the session is established. VASA provider 304, 308 validates a session identifier every time a request is received from a virtual server. A virtual server may invoke the "SetContext" API to obtain a new session identifier, even when a new secure connection has not been created.

In at least one embodiment of the current technique, data storage system 300 provides storage system information associated with storage devices of disk array 382 to a virtual server such as vCenter™ Server 320 (illustrated in FIG. 10 as virtual server-1 350, virtual server-2 352, virtual server-n 354) based on a usage context provided by a virtual client of the virtual server. A virtual client of a virtual server provides a usage context to data storage 300 system after a connection is established between the virtual client and the data storage system 300. Further, the virtual client updates the usage context each time the virtual client detects a change in storage elements associated with the usage context. A usage context may include information such as a list of paths of ESX hosts' initiator and a data storage system port receiving the request (e.g. world wide names), a list of iSCSI Qualified Names (IQN), and a list of NFS mount points (e.g., server name/IP+ file system path) of the ESX hosts. Data storage system 300 uses information of a usage context to appropriately filter storage system information of storage devices and provides a subset of the storage system information to a virtual client such that the subset of the storage information provided is relevant to the usage context of the virtual client. For example, on a block based data storage system, block initiators may be mapped to a set of LUNs associated with the block initiators by using a storage group association. Similarly, for example, on a block and file based data storage system, IQNs and NFS mount points may be used to locate VMware® applications (such as applications using a NFS data store, VMFS data store) that are used by an ESX host managed by a vCenter™ Server. In at least one embodiment of the current technique, the "SetContext" VASA API establishes a usage context for a virtual server. VASA provider 304, 308 maps information associated with a usage context to storage system information of data storage system 300 such as list of arrays, processors, ports, LUNs, and file systems. VASA provider 304, 308 uses information associated with a usage context for reporting storage system information to a virtual client of a virtual server by filtering information of storage elements from the storage system information that are not associated with the usage context of the virtual server.

In at least one embodiment of the current technique, a virtual server sends a full query to data storage system 300 to retrieve storage system information for every storage elements associated with a usage content of the virtual server after a connection is established by the virtual server with the data storage system 300. However, each subsequent query issued by the virtual server is a partial query that retrieves information associated with changes in the storage system information retrieved by the full query (such as instances of storage elements added and/or removed from the storage system information). In other words, the virtual server issues a query to request a list of changed storage elements instead of issuing a full query after the connection is established and the initial full query retrieves the storage system information. A configuration change event is queued for a storage element (also referred to as "storage object") when data storage system 300 detects a change in the storage element that may alter any one of a VASA-defined storage property for the storage element. Data storage system 300 processes a queue of configuration change events in order to provide a list of changed storage elements to a virtual server. A virtual server periodically request a list of configuration change events and updates storage system information associated with a usage context of the virtual server based on the list of configuration change events. For example, if data storage system 300 provides a list of events associated with changes in storage system information associated with a set of LUNs, a virtual server queries the set of LUNs associated with the list of events. Events and alarms are gathered to log changes in health, capacity and status of a storage entity. An events may also include system events that provide description of an alarm.

With reference also to FIG. 9, in at least one embodiment of the current technique, VASA provider 304, 308 of data storage system 300 provides up-to-date storage system information to a virtual client (e.g., vSphere™ Client 324) of a virtual server (e.g., vCenter™ Server 320) by maintaining lists (or queues) of events and alarms. A list of events includes configuration change events that are relevant to a usage context established for a session initiated by a virtual client of a virtual server. Similarly, a list of alarms includes storage system alarms that are relevant to a usage context established for a session initiated by a virtual client of a virtual server. A configuration scope is defined by usage context provided to the "SetContext" VASA API such that the configuration scope is applicable to queries sent by a virtual server to data storage system 300 after a session is established. Further, a configuration scope may also be defined by configuration change events and storage system alarms collected in queues by VASA provider 304, 308. However, a configuration scope may be changed by a virtual server when the virtual server executes the "SetContext" VASA API. VASA provider 304, 308 may manage one or more sessions from one or more virtual servers such that a maximum number of sessions that may be managed is configurable by a user or a system. Further, a session context state associated with a session may be invalidated and reset in response to either execution of a VASA API (e.g., "SetContext" API) by a virtual server or as a result of an error condition. A session context reset condition may trigger a full query by a virtual server.

In at least one embodiment of the current technique, VASA protocol adapter 364 may be implemented as a component that converts a query received from a virtual server in a format that is used by data storage system 300. VASA common provider 366 includes a set of interfaces that are common to different types of data storage systems such as a block based storage system, a file based data storage system.

In at least one embodiment of the current technique, VASA provider block adapter 368 is a VASA provider that may be implemented as a dynamically loadable library 362 (e.g., a DLL on Microsoft® Windows™, a share library on Linux). Further, VASA provider block adapter 368 may also be implemented as a dynamically loadable library in order to leverage a modular generic framework for querying provider components (e.g., storage provider 378, alert provider 380), subscribing to indications, and posting alarms to VASA common provider 366. Further, VASA provider block adapter 368 reports storage system information (e.g., storage topology, configuration information) of the disk array 382 and storage entities of data storage system 300 to one or more virtual servers based on a usage context of a session established between a virtual server and VASA provider block adapter 368. The VASA provider block adapter 368 includes support for VASA APIs that may provide storage information such as a list of storage entities based on a type of a storage entity, details of storage topology of the storage entities, storage properties for the storage entities, and events for reporting configuration changes.

In at least one embodiment of the current technique, a common cache 370 is created for storing storage system information in a memory of data storage system 300 such that the storage system information is reported to a virtual client connected to a virtual server. A virtual server establishes a session with data storage system 300 for retrieving storage system information. For example, virtual server-1 350 creates a session-1, virtual server-2 creates a session-2, and virtual server-n creates a session-n. A session view is created and maintained by a virtual server when the virtual server establishes a session with data storage system 300. For example, virtual server-1 350 creates a session view-1 374, virtual server-2 352 creates a session view-2 372, and virtual server-n 354 creates a session view-n 376. A session view caches information associated with a set of storage entities that are relevant to a usage context of a session associated with the session view of a virtual server such that the information stored in the session view is reported to the virtual server instead of retrieving the information from the disk array 382 using provider components (e.g. storage provider 378).

Figure 11:
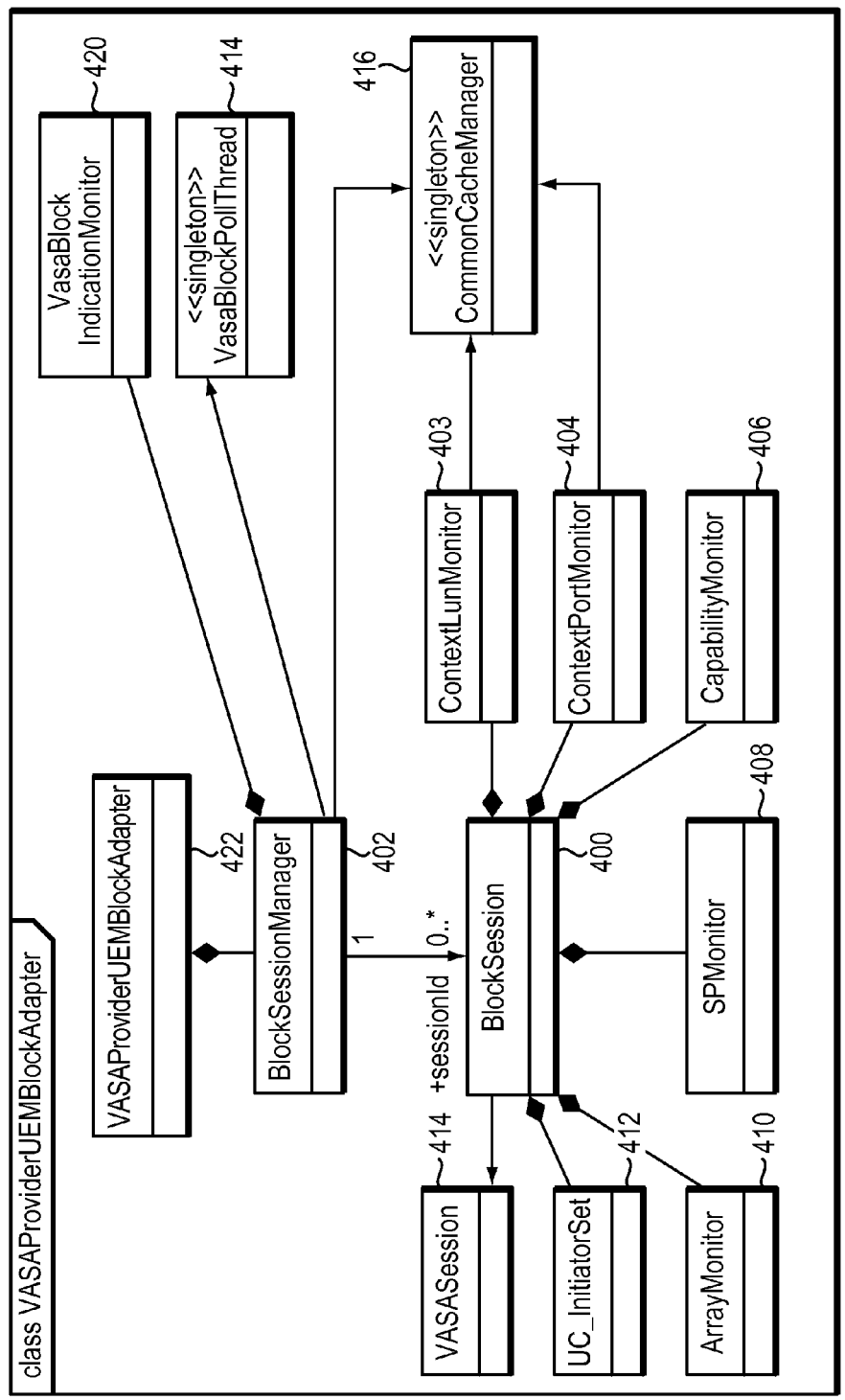
FIGS. 11-12 are class diagrams illustrating in more detail components that may be used in connection with techniques herein.

Referring to FIG. 11, shown is detailed representation of class structures used for an example implementation of VASA provider block adapter 368. A class such as "blocksessionmanager" 402 creates an instance of a class "blocksession" 400 for each session created between an instance of a virtual server (e.g., vCenter™ Server) and VASA provider 304, 308 (e.g. VASA provider block adapter 368) of data storage system 300. The class "blocksession" 400 maintains a reference count for the session indicated by the class "VASAsession" 414 which includes a session identifier and a usage context indicated by a class "VASAusagecontext". The class "blocksession" 400 creates a monitor class for servicing each type of a VASA storage entity. The monitor class may include class objects such as class "arraymonitor" 410, "SPmonitor" 408, "contextLUNmonitor" 403, "contextportmonitor" 404 and "capabilitymonitor" 406. Class "blocksession" 400 creates a usage context initiator set indicated by class "uc_initiatorset" 412 for each entry of the class "VASAusagecontext" for analyzing storage system information stored in the monitor classes such as classes "contextLUNmonitor" 403, and "contextportmonitor" 404.

Class "VASAprovideruemblockadapter" 422 processes a query issued by an instance of a virtual server (e.g., vCenter™ Server). The query is processed by requesting a reference to an instance of the class "blocksession" 400 from the class "blocksessionmanager" 402. The reference is used to access a specific monitor class and execute the query for retrieving storage system information associated with the specific monitor class. A query for reporting storage system information for a specific type of storage entity is processed by a monitor class associated with the specific type of storage entity. Additionally, the monitor class associated with the specific type of storage entity manages events and alarms associated with the specific type of storage entity.

With reference also to FIG. 9, in at least one embodiment of the current technique, an instance of class "commoncachemanager" 416 is created to reduce an amount of time required to process a query using a VASA API (also referred o as "VASA query"). Class "commoncachemanager" 416 stores or caches storage system information associated with a set of storage entities of data storage system 300. Further, "commoncachemanager" 416 stores storage system information in a memory (e.g., volatile memory) of data storage system 300 after retrieving the storage system information from data storage system 300 if the storage system information is not found in the common cache 370 represented by an instance of the class "commoncachemanager" 416. Class "VASAprovideruemblockadapter" 422 queries storage provider 378 to retrieve storage system information in order to process a VASA query received from a virtual server. Additionally, class "VASAprovideruemblockadapter" 422 registers information to receive indications from alert provider 380 such that class "VASAprovideruemblockadapter" 422 may be notified regarding a change in storage system information of storage elements of data storage system 300. Upon receiving a notification, class "VASAprovideruemblockadapter" 422 post an event to a list of events, post an alarm to a list of alarms, and notifies a virtual server. A VASA poll thread indicated by class "VASApollthread" 418 executes and coordinates polling, and processing of indications received by class "VASAblockindicationmonitor" 420. For example, class "contextLUNmonitor" 403 query the class "commoncachemanager" 416 to retrieve storage information associated with a usage context for a set of LUNs associated with a session, and class "contextportmonitor" 404 query the class "commoncachemanager" 416 to retrieve storage information associated with a usage context for a set of ports associated with a session.

Figure 12:
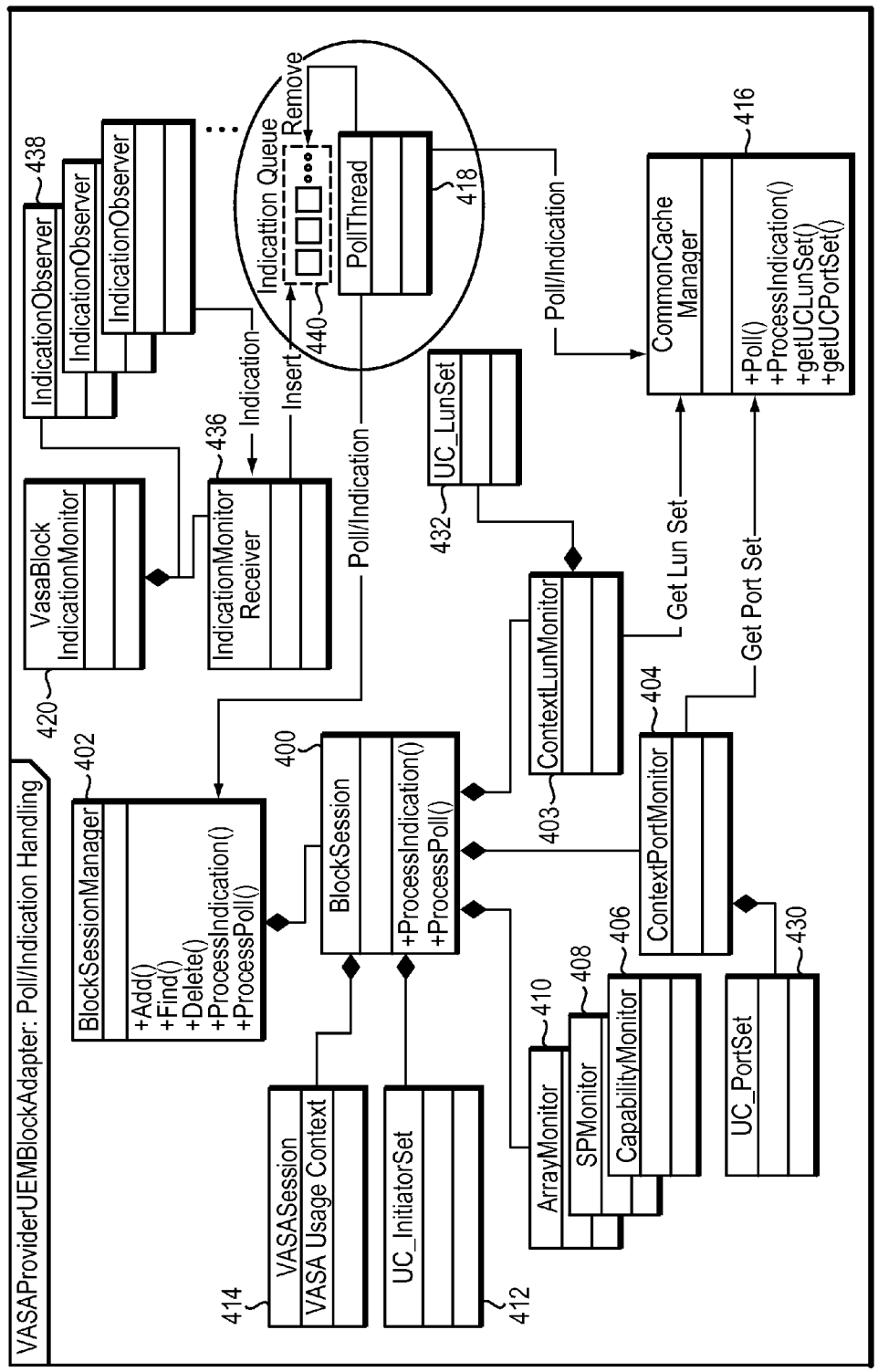

Referring to FIG. 12, shown is more detailed representation of class structures used for an example implementation of VASA provider block adapter 368. With reference also to FIGS. 9-11, in at least one embodiment of the current technique, class "VASAprovideruemblockadapter" 422 caches storage system information such as a list of path names for initiators of ESX hosts, storage properties for a set of LUNs, and storage properties for a set of ports in common cache 370. Moreover, class "VASAprovideruemblockadapter" 422 registers information to receive indications in order to maintain consistent storage system information in common cache 370, and report events indicating changes in configuration and/or storage properties of storage entities of data storage system 300 to VASA common provider 366. Storage system information associated with storage entities of data storage system 300 is retrieved by a polling process that is invoked at a regular time interval. Further, events and alarms are queued in VASA provider 304, 308 by each session (indicated by an instance of class "blocksession" 400) in data storage system 300 and one or more monitor classes when either an indication is processed or a poll is performed. A poll thread 418 co-ordinates the polling process and indication queue 440 manages processing of indications. In order to process indications, objects "IndicationMonitor" 420 and "IndicationObservers" 438 start executing prior to a first poll request to build "commoncachemanager" 416 is issued by the poll thread 418 such that the first poll request for building the cache is issued after the first session is established by a virtual server such that an indication associated with a change in a storage entity that may occur during the first poll request can be processed. Class "indicationmonitorreceiver" 436 receives an indication notification, and add the indication to indication queue 440 to ensure that indications are processed in an ordered arrangement. Class "VASAblockindicationmonitor" 420 manages class "indicationmonitorreceiver" 436, and registers/de-registers an instance of the class "indicationobserver" 438 such that the instance of the class "indicationobserver" 438 indicates an indication received by class "indicationmonitorreceiver" 436.

In at least one embodiment of the current technique, the "commoncachemanager" 416 retrieves storage system information in order to store the storage system information in common cache 370 by polling. After the "commoncachemanager" 416 completes the polling, the poll thread 418 issues a poll request to the "blocksessionmanager" 402 such that each instance of "blocksession" 400 may update its state information by using the updated storage system information of the common cache 370. Further, if a difference is found between the state information of each session and common cache 370, appropriate events and alarms are queued.

Figure 13:
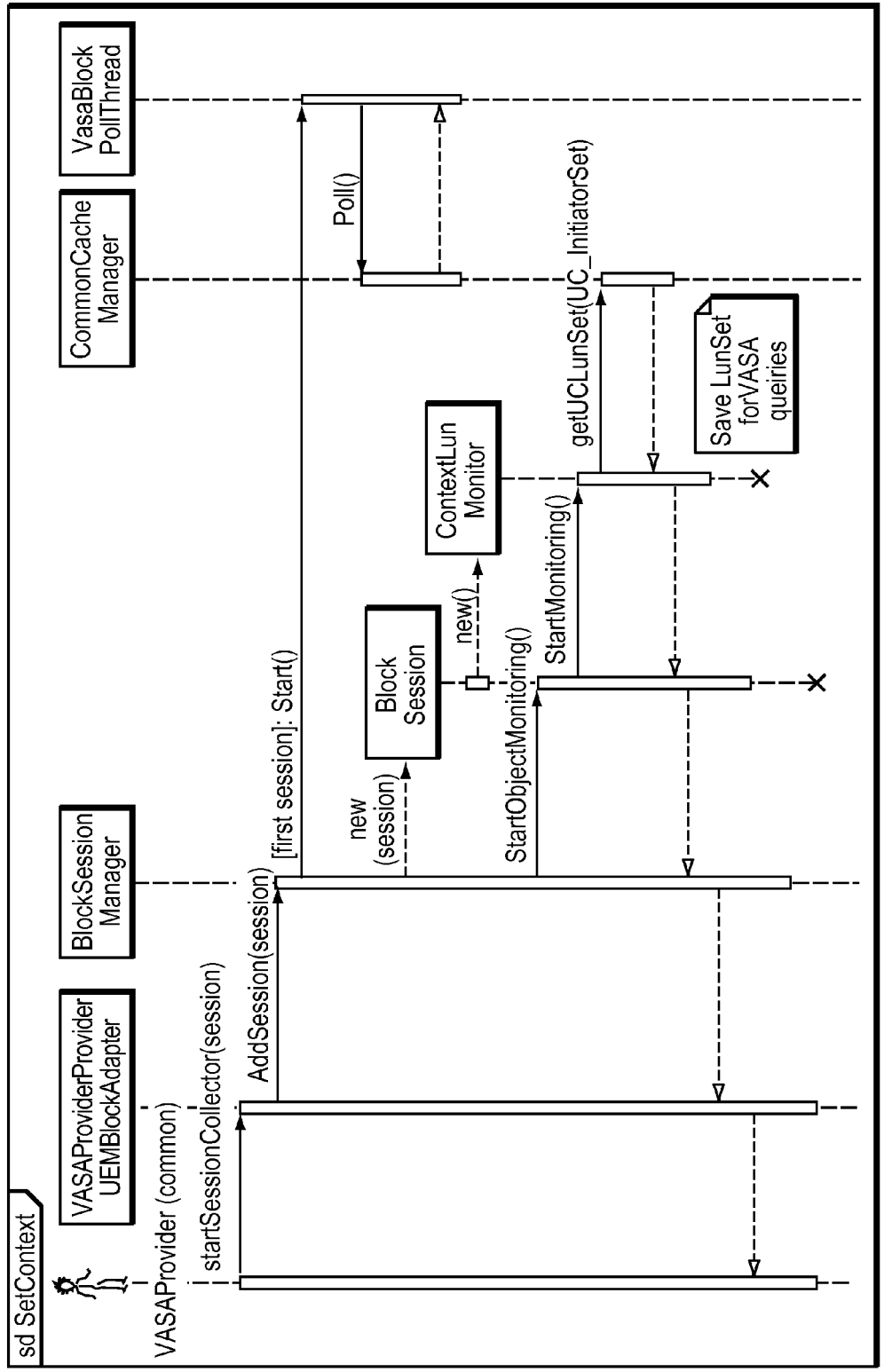
FIGS. 13-16 are diagrams illustrating an example of sequence of events that may be used in connection with techniques herein.

FIG. 13 illustrates a sequence for creating a usage context when a session is established by a virtual server. With reference also to FIGS. 9-12, in at least one embodiment of the current technique, a VASA API (e.g., "SetContext") starts a VASA session. Upon receiving the function call "SetContext", VASA common provider 366 invokes a function call (e.g. "startsessioncollector") to class "VASAprovideruemblockadapter" 422, which in turns, invokes a function call (e.g. "addsession") to class "blocksessionmanager" 402 for creating a session. Class "blocksessionmanager" 402 starts the session for processing VASA queries issued by the virtual server, and processing events and alarms received from data storage system 300. Further, class "blocksessionmanager" 402 starts a poll thread when the first session is established. Class "commoncachemanager" 416 executes a poll request to retrieve storage system information (e.g., configuration information for LUNs and ports) and stores the storage system information retrieved from data storage system 300 in common cache 370 of data storage system 300. The poll thread issues a poll request at a regular time interval (e.g. pre-defined scheduled poll cycle) for retrieving storage system information. The poll thread stops executing when a CIMOM component of data storage system 300 restarts.

Storage system information associated with a session is retrieved from data storage system 300 by querying storage provider 378, and stored in common cache 370 in a synchronous manner when the session is initially created in order to populate common cache 370 with the storage system information. Each subsequent VASA query from a virtual server is performed by retrieving storage system information from common cache 370 instead of querying storage provider 378. An instance of class "blocksession" 400 creates one or more instances of monitor classes (e.g. "contextLUNmonitor" 403) and process a VASA query targeted for a specific type of storage entity. For example, as shown in the example sequence diagram illustrated in FIG. 13, a monitor class such as "contextLUNmonitor" 403 queries "commoncachemanager" 416 to retrieve storage system information associated with a usage context for a set of LUNs.

Figure 14:
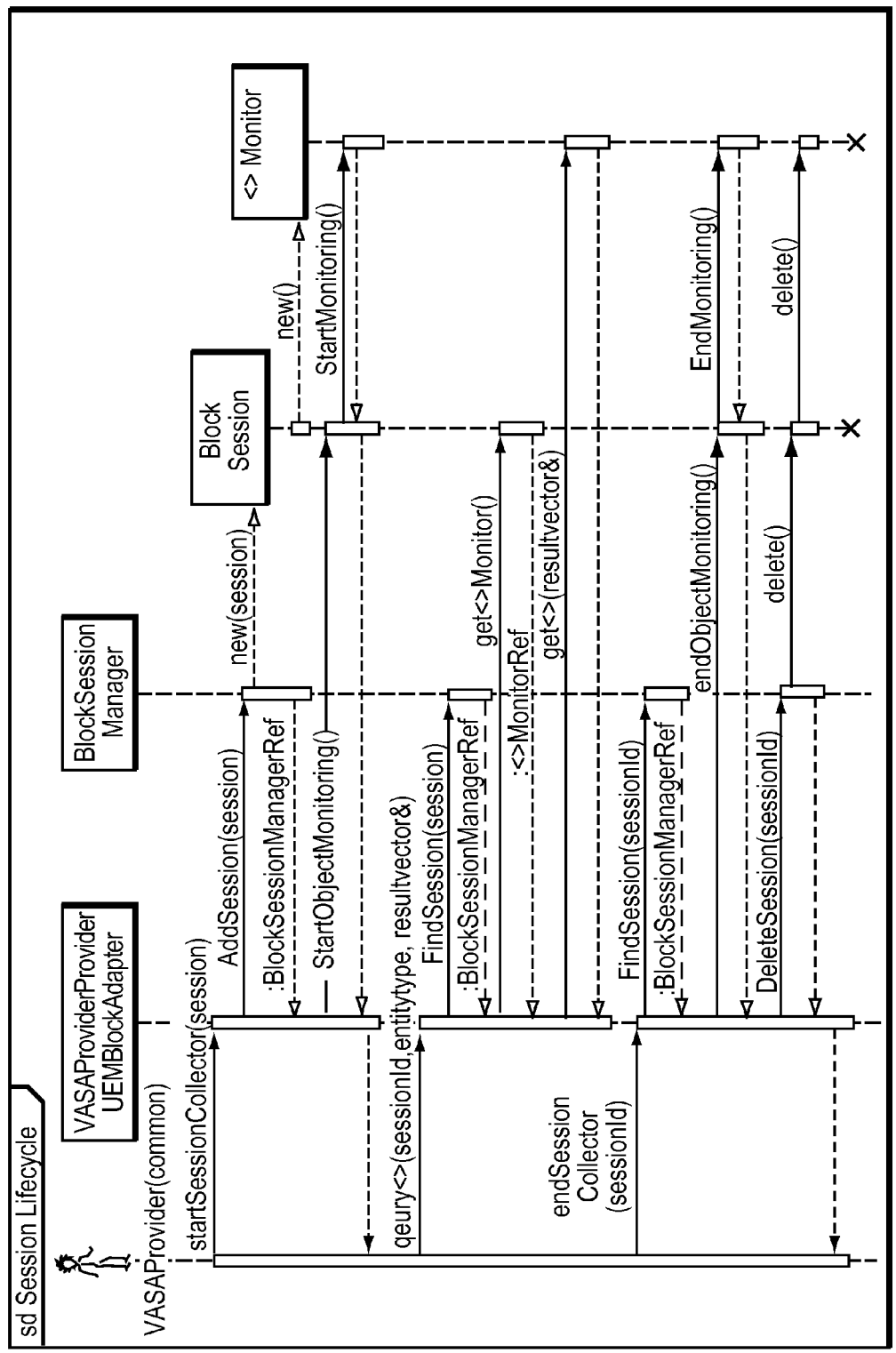

FIG. 14 illustrates a sequence for a life cycle of a session established between a virtual server and a VASA provider. With reference also to FIGS. 9-12, in at least one embodiment of the current technique, a VASA query is executed in context of a VASA session. VASA common provider 366 starts a VASA session by invoking an API (e.g. "startsessioncollector") to class "VASAprovideruemblockadapter" 422, and processes a VASA query in context of the VASA session. VASA common provider 366 stops the VASA session by invoking an API (e.g., "endsessioncollector"). Class "VASAprovideruemblockadapter" 422 starts a session by invoking an API (e.g. "addsession") to class "blocksessionmanager" 402, which creates an instance of a class "blocksession" 400. Class "blocksessionmanager" 402 maintains a map of session identifiers and instances of class "blocksession" 400 such that a session is associated with a session identifier and corresponding instance of class "blocksession" 400. Further, an instance of class "blocksession" 400 creates one or more instances of monitor classes for each type of storage entity and invokes an API (e.g., "startmonitoring") to an appropriate instance of a monitor class based on a type of storage entity for which storage system information is requested by a virtual server. Each instance of a monitor class uses a poll request and an indication process request to retrieve storage system information. VASA common provider 366 invokes an API (e.g., "endsessioncollector") to stop the VASA session and remove the session identifier associated with the VASA session from the map maintained by class "blocksessionmanager" 402.

Figure 15:
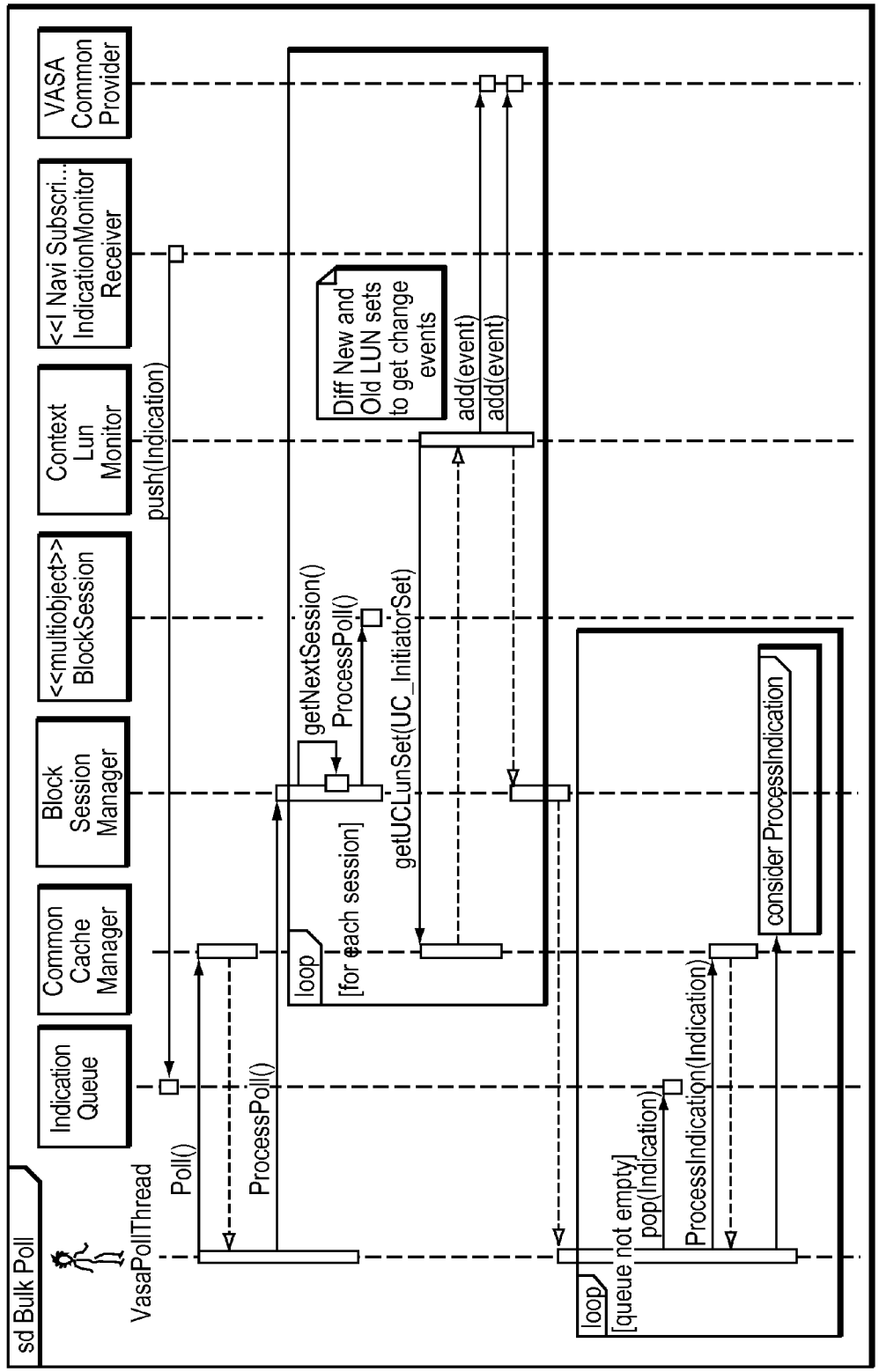

FIG. 15 illustrates a sequence for a bulk poll request that is performed to create a common cache when a session is initially established between a virtual server and a VASA provider. With reference also to FIGS. 9-12, in at least one embodiment of the current technique, a bulk poll request is invoked when a first VASA session is established or an error (such as a large number of indication requests that may not be processed efficiently or a VASA query times out) occurs. A bulk poll request populates common cache 370 with storage system information by sending a request to "commoncachemanager" 416. Class "blocksessionmanager" 402 issues an API (e.g., "processpoll") that enable each instance of class "blocksession" 400 to update common cache 370 with storage system information. An indication request added to the indication queue 440 during the bulk poll request is processed by "commoncachemanager" 416 and each instance of class "blocksession" 400.

Figure 16:
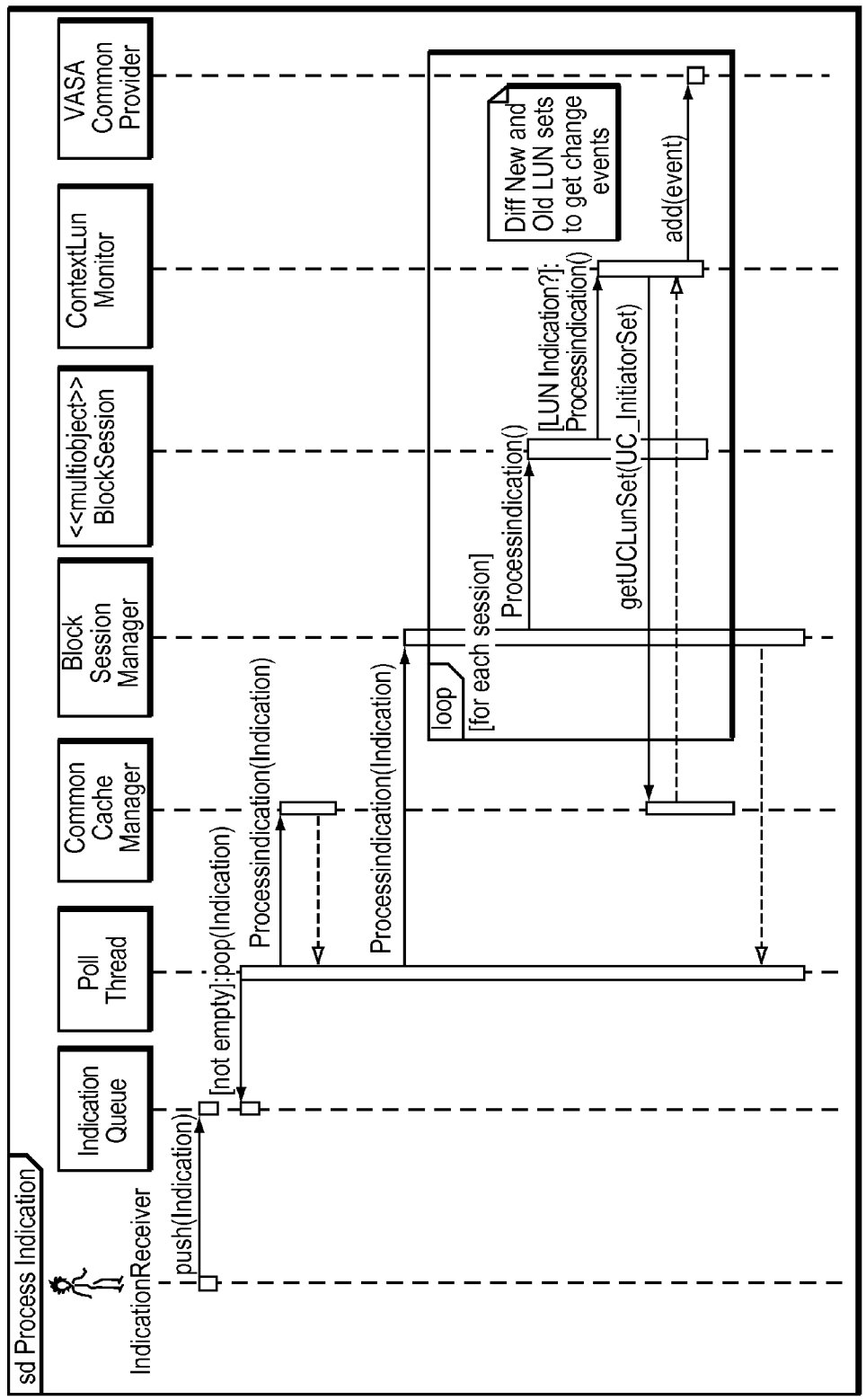

FIG. 16 illustrates a sequence for processing an indication received upon detecting a change in configuration or storage system information of a data storage system. With reference also to FIGS. 9-12, in at least one embodiment of the current technique, class "VASAblockindicationmonitor" 420 registers every indication that is required to support each type of storage entity for which storage system information may be retrieved by a VASA query from a virtual server. Class "indicationmonitorreceiver" 436 is notified when an indication is triggered by an event or an alarm. The indication is added to indication queue 440. The poll thread 418 removes an indication from indication queue 440 and provides the indication to "commoncachemanager" 416 and "blocksessionmanager" 402 for processing the indication.

In at least one embodiment of the current technique, multiple VASA queries associated with a session may be executed concurrently using multiple processes (e.g., threads) such that each VASA query of the multiple VASA queries are processed by each process of the multiple processes. Similarly, multiple indications may be posted to the indication queue 440 concurrently using multiple processes (e.g., threads) such that each indication of the multiple indications are processed by each process of the multiple processes. However, each indication from the indication queue 440 are processed sequentially using a single process (e.g., thread). Class "blocksessionmanager" 402 provides a locking scheme for processing a VASA query. Each instance of monitor classes (e.g. "contextLUNmonitor" 403, "contextportmonitor" 404) provides a reader/writer lock to prevent contention between two or more VASA queries.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing caches for reporting storage system information, the method comprising:
creating a common cache, wherein the common cache includes information associated with a set of storage objects of a data storage system;
making the information of the common cache available to a set of virtual systems, wherein the set of virtual systems uses the information for reporting storage system information associated with the set of storage objects, wherein each virtual system of the set of virtual systems creates a session with the data storage system, wherein the storage information associated with the set of storage objects is retrieved from the data storage system and added to the common cache upon creation of a first session by a first virtual system of the set of virtual systems with the data storage system, wherein the common cache is used for providing the storage system information to the set of virtual systems upon receiving subsequent requests from the set of virtual systems, wherein the storage system information is provided to a virtual system of the set of virtual systems based on a usage context provided by the virtual system upon establishing a session with the data storage system, wherein a session view is created and managed by the virtual system of the set of virtual systems upon establishing the session with the data storage system;
notifying the common cache regarding a change in the storage system information associated with the set of storage objects; and
notifying the set of virtual systems for retrieving updated storage system information from the common cache.

2. The method of claim 1, wherein the virtual system includes a VMware® ESX Server™, a VMware® Virtual Center™ server, and a set of virtual machines.

3. The method of claim 1, further comprising
creating a session between the virtual system and the data storage system.

4. The method of claim 3, wherein the session is associated with a session view, wherein the session view caches a subset of information retrieved from the cache based on a usage context associated with the session.

5. The method of claim 4, further comprising providing the subset of information cached in the session view to the virtual system.

6. The method of claim 1, further comprising providing the updated information of the cache to the virtual system using a list of events and a list of alarms.

7. The method of claim 1, wherein creating the cache further comprising:
polling the data storage system for retrieving storage system information by issuing a full query, wherein the polling is performed after a first session is established between the virtual system and the data storage system;
sending a poll request to each session view associated with each session established between the virtual system and the data storage system, wherein each session view updates information stored in each session view; and
polling the data storage system at a regular time interval by issuing a partial query to update the cache with changes in the storage system information.

8. The method of claim 7, further comprising
receiving an indication upon change in the storage system information; and
processing the indication to update the cache based on the change in the storage system information.

9. A system for use in managing caches for reporting storage system information, the system comprising a processor configured to:
create a common cache, wherein the common cache includes information associated with a set of storage objects of a data storage system;
make the information of the common cache available to a set of virtual systems, wherein the set of virtual systems uses the information for reporting storage system information associated with the set of storage objects, wherein each virtual system of the set of virtual systems creates a session with the data storage system, wherein the storage information associated with the set of storage objects is retrieved from the data storage system and added to the common cache upon creation of a first session by a first virtual system of the set of virtual systems with the data storage system, wherein the common cache is used for providing the storage system information to the set of virtual systems upon receiving subsequent requests from the set of virtual systems, wherein the storage system information is provided to a virtual system of the set of virtual systems based on a usage context provided by the virtual system upon establishing a session with the data storage system, wherein a session view is created and managed by the virtual system of the set of virtual systems upon establishing the session with the data storage system;
notify the common cache regarding a change in the storage system information associated with the set of storage objects; and
notify the set of virtual systems for retrieving updated storage system information from the common cache.

10. The system of claim 9, wherein the virtual system includes a VMware® ESX Server™, a VMware® Virtual Center™ server, and a set of virtual machines.

11. The system of claim 9, further comprising
create a session between the virtual system and the data storage system.

12. The system of claim 11, wherein the session is associated with a session view, wherein the session view caches a subset of information retrieved from the cache based on a usage context associated with the session.

13. The system of claim 12, further comprising:
provide the subset of information cached in the session view to the virtual system.

14. The system of claim 9, further comprising:
provide the updated information of the cache to the virtual system using a list of events and a list of alarms.

15. The system of claim 9, wherein creating the cache further comprising:
poll the data storage system for retrieving storage system information by issuing a full query, wherein the polling is performed after a first session is established between the virtual system and the data storage system;
send a poll request to each session view associated with each session established between the virtual system and the data storage system, wherein each session view updates information stored in each session view; and
poll the data storage system at a regular time interval by issuing a partial query to update the cache with changes in the storage system information.

16. The system of claim 15, further comprising
receive an indication upon change in the storage system information; and process the indication to update the cache based on the change in the storage system information.

* * * * *